United States Patent
Sasaki et al.

(10) Patent No.: US 10,872,624 B1
(45) Date of Patent: Dec. 22, 2020

(54) MAGNETIC HEAD INCLUDING A RETURN PATH SECTION

(71) Applicants: Yoshitaka Sasaki, Los Gatos, CA (US);
Hiroyuki Ito, Milpitas, CA (US);
Kazuki Sato, Milpitas, CA (US);
Shigeki Tanemura, Milpitas, CA (US);
Hironori Araki, Milpitas, CA (US);
Yukinori Ikegawa, Milpitas, CA (US)

(72) Inventors: Yoshitaka Sasaki, Los Gatos, CA (US);
Hiroyuki Ito, Milpitas, CA (US);
Kazuki Sato, Milpitas, CA (US);
Shigeki Tanemura, Milpitas, CA (US);
Hironori Araki, Milpitas, CA (US);
Yukinori Ikegawa, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 16/655,473

(22) Filed: Oct. 17, 2019

(51) Int. Cl.
*G11B 5/17* (2006.01)
*G11B 5/127* (2006.01)
*G11B 5/31* (2006.01)

(52) U.S. Cl.
CPC .............. *G11B 5/1278* (2013.01); *G11B 5/17* (2013.01); *G11B 5/315* (2013.01); *G11B 5/3116* (2013.01); *G11B 5/3126* (2013.01); *G11B 5/313* (2013.01)

(58) Field of Classification Search
None
See application file for complete search history.

(56) References Cited

U.S. PATENT DOCUMENTS

| | | | |
|---|---|---|---|
| 6,185,068 B1 * | 2/2001 | Fujita | G11B 5/313 360/123.41 |
| 8,345,381 B1 | 1/2013 | Sasaki et al. | |
| 8,358,487 B2 * | 1/2013 | Sasaki | G11B 5/1278 360/123.08 |
| 8,593,762 B1 * | 11/2013 | Sasaki | G11B 5/1278 360/123.06 |
| 8,792,209 B2 * | 7/2014 | Sasaki | G11B 5/1278 360/123.06 |
| 8,896,967 B2 * | 11/2014 | Sasaki | G11B 5/1278 360/123.06 |
| 9,218,827 B1 * | 12/2015 | Sasaki | G11B 5/17 |
| 9,230,568 B1 | 1/2016 | Ikegawa et al. | |
| 9,251,812 B2 | 2/2016 | Sasaki et al. | |
| 9,715,888 B1 * | 7/2017 | Bashir | G11B 5/17 |
| 9,799,351 B1 * | 10/2017 | Liu | G11B 5/3123 |
| 2004/0240106 A1 * | 12/2004 | Iitsuka | G11B 5/3103 360/123.46 |

(Continued)

*Primary Examiner* — Jefferson A Evans
(74) *Attorney, Agent, or Firm* — Oliff PLC

(57) ABSTRACT

A magnetic head includes a coil, a main pole, a write shield, a lower return path section, and an accommodation section. The accommodation section accommodates at least part of the return path section. A first portion of the accommodation section has a first inclined surface. A second portion of the accommodation section has a second inclined surface. A coil element of the coil has a third inclined surface opposed to the first inclined surface, and a fourth inclined surface opposed to the second inclined surface. The lower return path section includes a first inclined portion extending along the first inclined surface, and a second inclined portion extending along the second inclined surface.

9 Claims, 21 Drawing Sheets

(56) References Cited

U.S. PATENT DOCUMENTS

| | | | |
|---|---|---|---|
| 2011/0242694 A1* | 10/2011 | Taguchi | G11B 5/1278 360/39 |
| 2012/0182644 A1* | 7/2012 | Matsumoto | G11B 5/17 360/99.08 |
| 2013/0283601 A1* | 10/2013 | Sasaki | G11B 5/315 29/603.07 |
| 2014/0177099 A1* | 6/2014 | Sasaki | G11B 5/1278 360/123.12 |

* cited by examiner

MAGNETIC HEAD INCLUDING A RETURN PATH SECTION

BACKGROUND OF THE INVENTION

1. Field of the Invention

The present invention relates to a magnetic head used for writing data on a recording medium by means of a perpendicular magnetic recording system, and more specifically, to a magnetic head including a return path section.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface to face a recording medium. The coil generates a magnetic field corresponding to data to be written on the recording medium. The main pole passes a magnetic flux corresponding to the magnetic field generated by the coil and generates a write magnetic field from the end face.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is backward in the direction of travel of the recording medium relative to the slider. The trailing side is forward in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit around the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, the skew mentioned above can induce the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the occurrence of unwanted erasure.

To prevent the occurrence of unwanted erasure induced by a skew as described above and achieve higher recording densities, it is effective to provide a shield near the main pole. U.S. Pat. Nos. 8,345,381 B1, 9,230,568 B1, and 9,251,812 B2 each disclose a magnetic head including a write shield having an end face that is located in the medium facing surface and surrounds the end face of the main pole.

Typically, in the magnetic head including the write shield, one or more return path sections are provided to connect a portion of the main pole located away from the medium facing surface to the write shield. A configuration of a lower return path section disposed on the leading side of the main pole will be discussed here. In a magnetic head, the read head unit and the write head unit stacked over the surface of the substrate are typically located on the trailing side relative to the top surface of the substrate. In such a case, the lower return path section is located between the main pole and the top surface of the substrate. The main pole and the lower return path section define a space for a portion of the coil to pass through. Hereinafter, a portion of the lower return path section located on a side of the aforementioned space closer to the medium facing surface will be referred to as a first portion, and a portion of the lower return path section located on a side of the aforementioned space farther from the medium facing surface will be referred to as a second portion.

In the magnetic head illustrated in FIG. 2 of U.S. Pat. No. 9,230,568 B1, a second return path section 30R corresponds to the lower return path section. In this magnetic head, a portion of the second return path section 30R corresponding to the first portion of the lower return path section is entirely exposed in the medium facing surface.

In the magnetic head illustrated in FIG. 3 of U.S. Pat. No. 9,251,812 B2, a structure constituted of magnetic layers 31, 32, 33, 34, 35 and 36 corresponds to the lower return path section. In this magnetic head, a portion of the foregoing structure corresponding to the first portion of the lower return path section is partly exposed in the medium facing surface. An insulating layer made of an insulating material is interposed between the medium facing surface and the remainder of the portion of the foregoing structure corresponding to the first portion of the lower return path section.

In the magnetic head including the lower return path section, the lower return path section and insulating layer around the coil expand due to heat generated by the coil. If the lower return path section has an end face located in the medium facing surface, the heat generated by the coil causes the end face of the lower return path section constituting part of the medium facing surface to protrude. This causes the end face of the main pole to get farther from the recording medium, resulting in the problem of degradation in write characteristics. The problem becomes significant if the end face of the lower return path section is exposed over a large area in the medium facing surface as in the magnetic head illustrated in FIG. 2 of U.S. Pat. No. 9,230,568 B1, in particular.

In contrast, as in the magnetic head illustrated in FIG. 3 of U.S. Pat. No. 9,251,812 B2, part of the first portion of the lower return path section may be located at a distance from the medium facing surface with an insulating layer harder than a magnetic material interposed between the medium facing surface and the part of the first portion of the lower return path section. This makes it possible to prevent a protrusion of a portion of the medium facing surface near the lower return path section, thus allowing the end face of the main pole to be prevented from getting farther from the recording medium.

With increases in frequency of write signals to achieve higher recording densities, faster rise of recording currents flowing through the coil is demanded of magnetic heads. To meet such a demand, it is effective to reduce the length of a magnetic path passing through the write shield, the return path section and the main pole. To reduce the magnetic path length in the magnetic head including the lower return path section, it is effective to bring the second portion of the lower return path section near the medium facing surface. If part of the first portion of the lower return path section is brought away from the medium facing surface as in the magnetic head illustrated in FIG. 3 of U.S. Pat. No. 9,251,812 B2, the second portion of the lower return path section gets away from the medium facing surface.

In the magnetic head illustrated in FIG. 1 of U.S. Pat. No. 8,345,381 B1, a first inclined portion 31B of a magnetic film 31 of a first return path section 30 corresponds to the first portion of the lower return path section. The first inclined portion 31B extends along an inclined surface inclined with respect to the medium facing surface. An interposer formed of an inorganic insulating material is interposed between the first inclined portion 31B and the medium facing surface. In such a manner, by making the first portion of the lower return path section extend along an inclined surface and providing an interposer harder than a magnetic material between the first portion and the medium facing surface, it becomes possible to reduce the magnetic path length while preventing a protrusion of a portion of the medium facing surface near the lower return path section.

Reducing the number of turns of the coil is effective at achieving a further reduction in the magnetic path length. However, when the coil has a reduced number of turns, it may not be possible to sufficiently prevent a protrusion of a portion of the medium facing surface near the lower return path section by simply making the first portion of the lower return path section extend along the inclined surface and providing an interposer between the first portion and the medium facing surface.

SUMMARY OF THE INVENTION

It is an object of the present invention to provide a magnetic head that makes it possible to prevent degradation of write characteristics while achieving reduction in length of a magnetic path passing through a write shield, a return path section and a main pole.

A magnetic head of the present invention includes: a medium facing surface configured to face a recording medium; a coil configured to generate a magnetic field corresponding to data to be written on the recording medium; a main pole having an end face located in the medium facing surface, the main pole being configured to pass a magnetic flux corresponding to the magnetic field generated by the coil and to generate a write magnetic field for writing data on the recording medium; a write shield formed of a magnetic material and having a shield end face located in the medium facing surface; a lower return path section formed of a magnetic material; an accommodation section formed of a nonmagnetic material and accommodating at least part of the lower return path section; and a substrate having a top surface. The coil, the main pole, the write shield, the lower return path section and the accommodation section are located above the top surface of the substrate.

The shield end face includes a first end face portion located farther from the top surface of the substrate than the end face of the main pole, and a second end face portion located closer to the top surface of the substrate than the end face of the main pole. The lower return path section is located between the main pole and the top surface of the substrate and connects a portion of the main pole located away from the medium facing surface to the write shield so that a lower space is defined by the main pole, the write shield and the lower return path section. The coil includes a coil element extending to pass through the lower space. No portion of the coil other than the coil element lies in the lower space.

The accommodation section includes a first portion located closer to the medium facing surface than the coil element and interposed between the lower return path section and the medium facing surface, and a second portion located farther from the medium facing surface than the coil element. The first portion has a first inclined surface facing the lower return path section. The second portion has a second inclined surface facing the lower return path section. The coil element has a third inclined surface opposed to the first inclined surface, and a fourth inclined surface opposed to the second inclined surface.

Each of the first to fourth inclined surfaces has a top end farthest from the top surface of the substrate and a bottom end closest to the top surface of the substrate. Each of the first and third inclined surfaces is inclined with respect to the medium facing surface such that the distance from the medium facing surface to the bottom end is greater than the distance from the medium facing surface to the top end. Each of the second and fourth inclined surfaces is inclined with respect to the medium facing surface such that the distance from the medium facing surface to the bottom end is smaller than the distance from the medium facing surface to the top end.

The lower return path section includes a first inclined portion located between the first inclined surface and the third inclined surface and extending along the first inclined surface, and a second inclined portion located between the second inclined surface and the fourth inclined surface and extending along the second inclined surface.

In the magnetic head of the present invention, the first inclined portion may further extend along the third inclined surface. The second inclined portion may further extend along the fourth inclined surface.

In the magnetic head of the present invention, the first and second portions of the accommodation section may be formed of an inorganic insulating material.

In the magnetic head of the present invention, a maximum dimension of the first portion of the accommodation section in a direction perpendicular to the medium facing surface may fall within a range of 0.1 to 0.4 µm. The dimension may be 0.3 µm or less.

In the magnetic head of the present invention, each of the first and second inclined surfaces may form an angle in the range of 5° to 45° with respect to the medium facing surface.

In the magnetic head of the present invention, each of the third and fourth inclined surfaces may form an angle in the range of 5° to 45° with respect to the medium facing surface.

In the magnetic head of the present invention, the accommodation section may further include a third portion located between the lower return path section and the top surface of the substrate. The third portion may have a connecting surface connecting the first inclined surface of the first portion and the second inclined surface of the second portion. In such a case, the lower return path section may include a magnetic film extending along the first inclined surface, the connecting surface and the second inclined surface. The magnetic film may include the first and second inclined portions. The magnetic film may have an end face located in the medium facing surface at a position farther from the top surface of the substrate than the accommodation section.

According to the present invention, the first portion of the accommodation section has a first inclined surface facing the lower return path section, and the second portion of the accommodation section has a second inclined surface facing lower return path section. The coil element has a third inclined surface opposed to the first inclined surface, and a fourth inclined surface opposed to the second inclined surface. The lower return path section includes a first inclined portion located between the first inclined surface and the third inclined surface and extending along the first inclined surface, and a second inclined portion located between the second inclined surface and the fourth inclined surface and extending along the second inclined surface. By virtue of this, it becomes possible according to the present invention to prevent degradation of write characteristics while achieving a reduction in length of a magnetic path that passes through the write shield, the return path section and the main pole.

Other objects, features and advantages of the present invention will become fully apparent from the following description.

DETAILED DESCRIPTION OF THE PREFERRED EMBODIMENTS

First Embodiment

Figure 2:
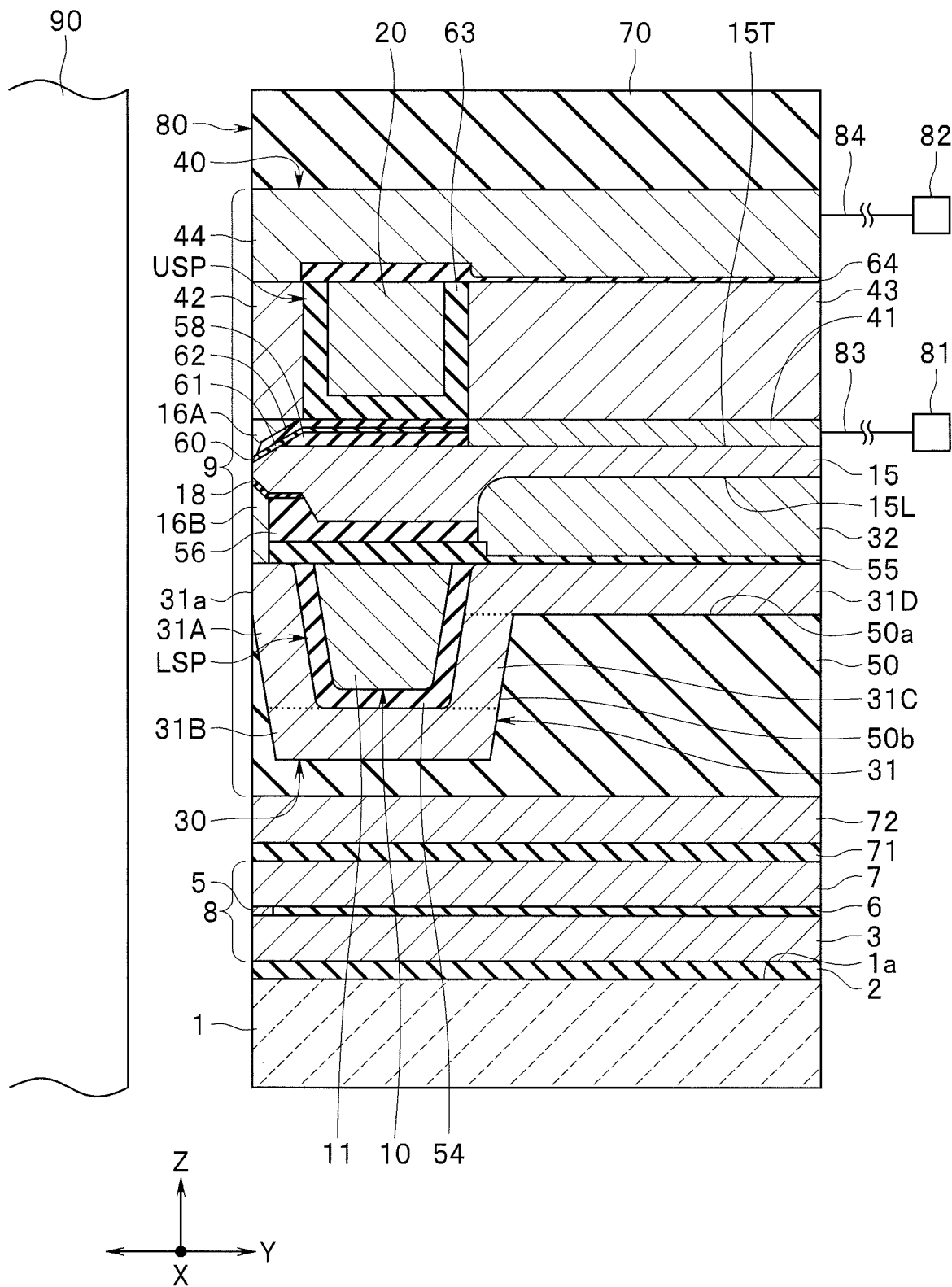
FIG. 2 is a cross-sectional view illustrating a configuration of the magnetic head according to the first embodiment of the invention.
Figure 3:
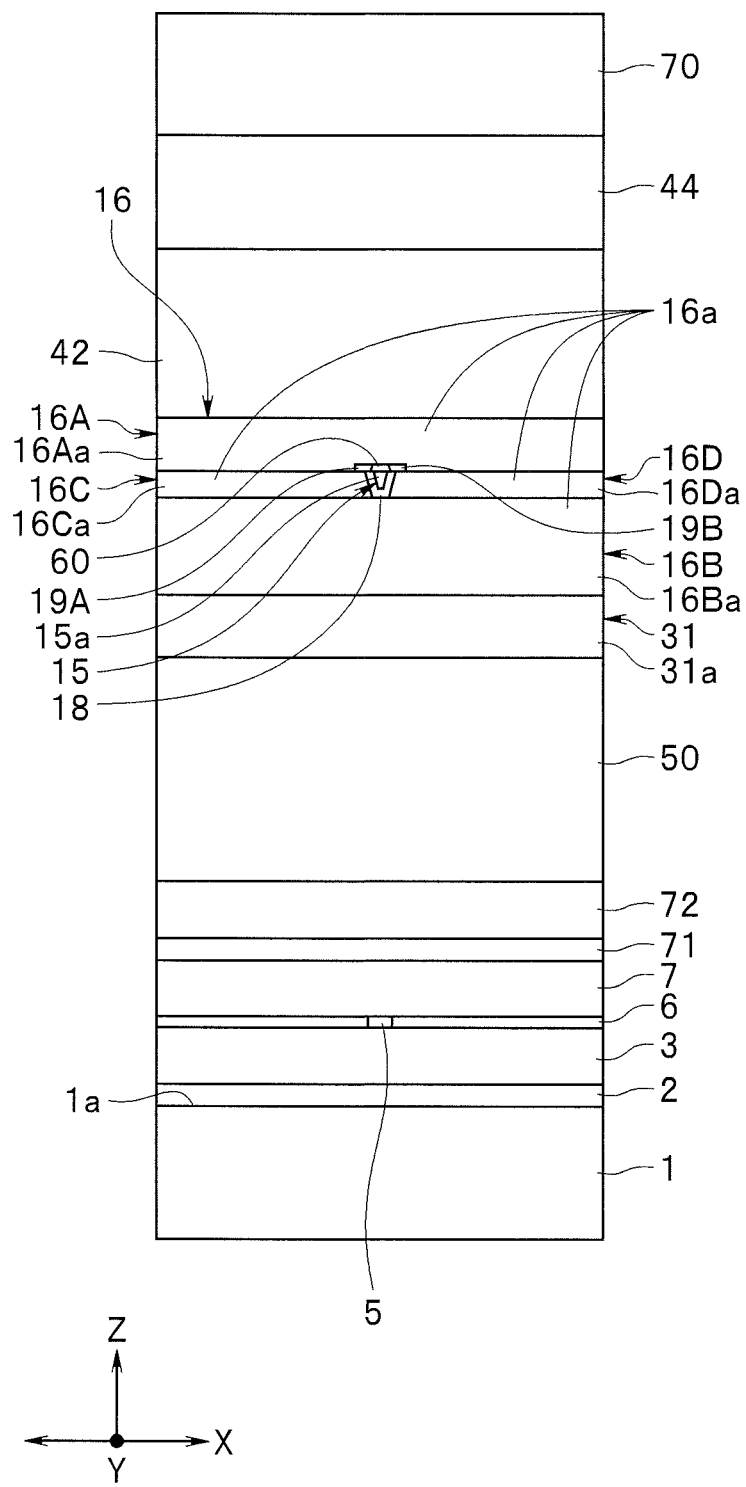
FIG. 3 is a front view illustrating a medium facing surface of the magnetic head according to the first embodiment of the invention.
Figure 4:
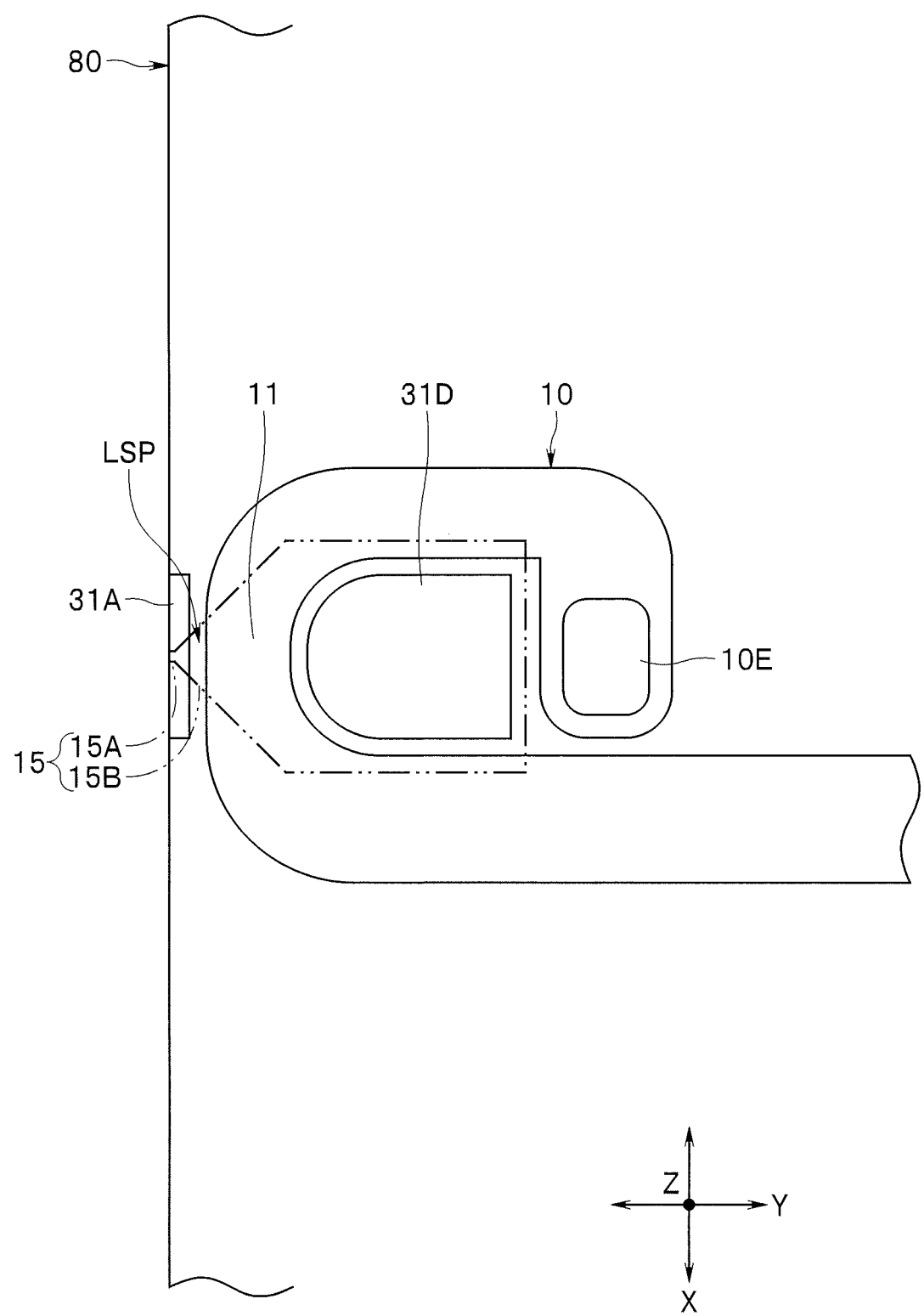
FIG. 4 is a plan view illustrating a lower coil portion of the magnetic head according to the first embodiment of the invention.
Figure 5:
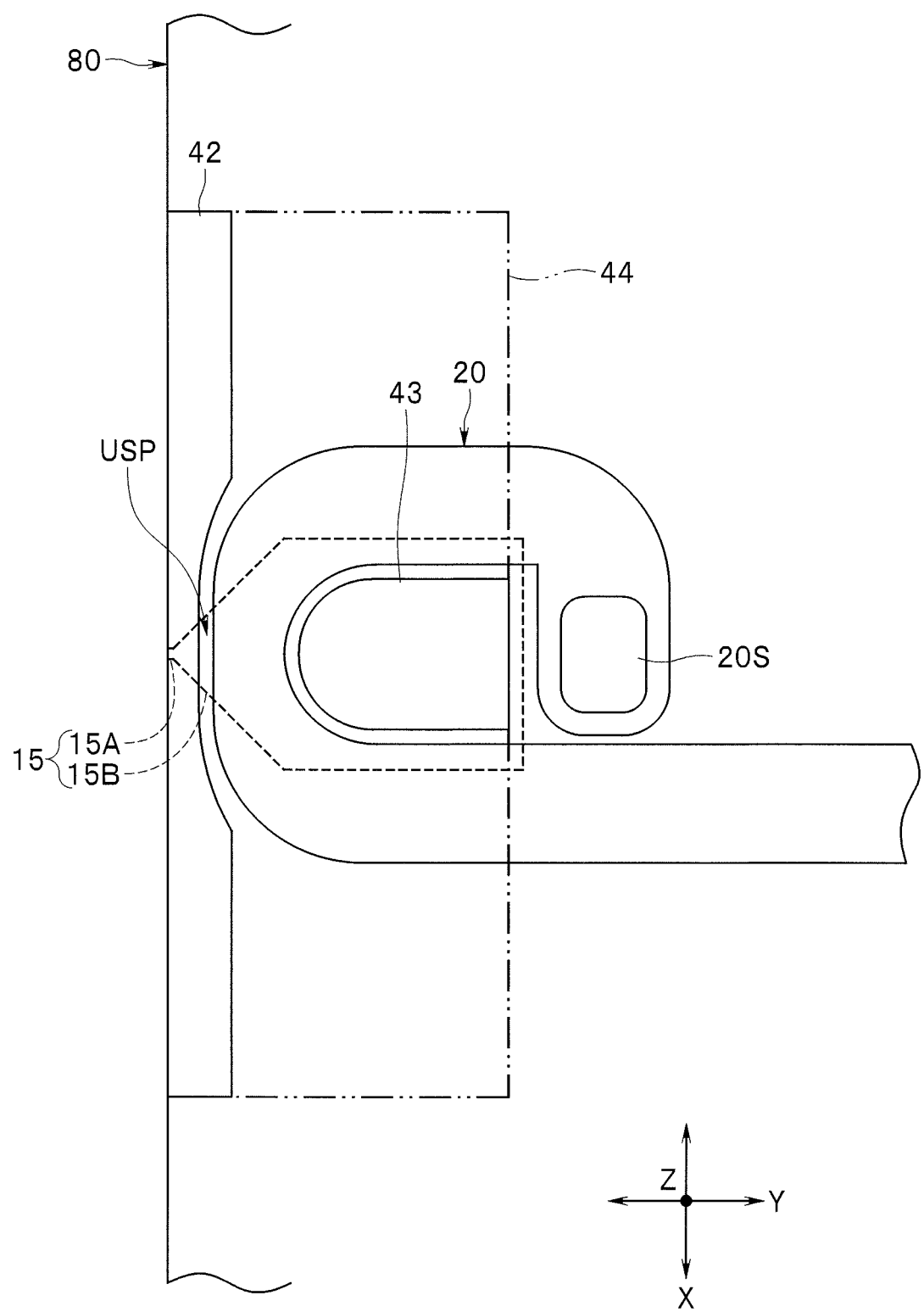
FIG. 5 is a plan view illustrating an upper coil portion of the magnetic head according to the first embodiment of the invention.

Preferred embodiments of the present invention will now be described in detail with reference to the drawings. First, reference is made to FIG. 2 to FIG. 5 to describe a configuration of a magnetic head according to a first embodiment of the invention. FIG. 2 is a cross-sectional view illustrating the configuration of the magnetic head. FIG. 3 is a front view illustrating the medium facing surface of the magnetic head. FIG. 4 is a plan view illustrating a lower coil portion of the magnetic head. FIG. 5 is a plan view illustrating an upper coil portion of the magnetic head.

The magnetic head according to the present embodiment is a magnetic head for perpendicular magnetic recording. The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

X, Y, and Z directions are defined here as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As illustrated in FIG. 2, the magnetic head has the medium facing surface 80. As illustrated in FIG. 2 and FIG. 3, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a magnetoresistive (MR) element 5 as a read element disposed on the first read shield layer 3; an insulating layer 6 formed of an insulating material and disposed around the MR element 5; and a second read shield layer 7 formed of a magnetic material and disposed on the MR element 5 and the insulating layer 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; and a write head unit 9 disposed on the middle shield layer 72. The middle shield layer 72 has the function of shielding the MR element 5 from magnetic fields generated in the write head unit 9. The nonmagnetic layer 71 is formed of alumina, for example.

The write head unit 9 includes a coil, a main pole 15, and a write shield 16. The coil generates a magnetic field corresponding to data to be written on the recording medium 90. The coil includes an upper coil portion 20 and a lower coil portion 10. Each of the upper coil portion 20 and the lower coil portion 10 is formed of a conductive material such as copper. The upper coil portion 20 and the lower coil portion 10 are connected in series or in parallel. The main pole 15 has an end face 15a located in the medium facing surface 80, and is configured to pass a magnetic flux corresponding to the magnetic field generated by the coil and to generate a write magnetic field for writing data on the recording medium 90 by means of a perpendicular magnetic recording system. FIG. 2 illustrates a cross section that intersects the end face 15a of the main pole 15 and that is perpendicular to the medium facing surface 80 and to the top surface 1a of the substrate 1.

As illustrated in FIG. 3, the write shield 16 has a shield end face 16a located in the medium facing surface 80. The shield end face 16a includes a first, a second, a third, and a fourth end face portion 16Aa, 16Ba, 16Ca, and 16Da.

The first end face portion 16Aa is located forward relative to the end face 15a of the main pole 15 in the direction of travel of the recording medium 90 (the Z direction). Being located forward relative to the end face 15a of the main pole 15 in the direction of travel of the recording medium 90 refers to being located farther from the top surface 1a of the substrate 1 than the end face 15a of the main pole 15. The first end face portion 16Aa can thus be said to be located farther from the top surface 1a of the substrate 1 than the end face 15a of the main pole 15.

The second end face portion 16Ba is located backward relative to the end face 15a of the main pole 15 in the direction of travel of the recording medium 90. Being located backward relative to the end face 15a of the main pole 15 in the direction of travel of the recording medium 90 refers to being located closer to the top surface 1a of the substrate 1 than the end face 15a of the main pole 15. The second end face portion 16Ba can thus be said to be located closer to the top surface 1a of the substrate 1 than the end face 15a of the main pole 15.

The third and fourth end face portions 16Ca and 16Da are located on opposite sides of the end face 15a of the main pole 15 in the track width direction (the X direction). In the medium facing surface 80, the first to fourth end face portions 16Aa, 16Ba, 16Ca and 16Da are arranged to surround the end face 15a of the main pole 15. The write shield 16 includes a trailing shield 16A, a leading shield 16B, and two side shields 16C and 16D. The trailing shield 16A is located forward relative to the main pole 15 in the direction of travel of the recording medium 90. The leading shield 16B is located backward relative to the main pole 15 in the direction of travel of the recording medium 90. The side shields 16C and 16D are located farther from the top surface 1a of the substrate 1 than the leading shield 16B, opposed to each other in the track width direction (the X direction) with the main pole 15 therebetween, and magnetically couple the trailing shield 16A and the leading shield 16B to each other.

As illustrated in FIG. 3, the trailing shield 16A has the first end face portion 16Aa. The leading shield 16B has the second end face portion 16Ba. The side shield 16C has the third end face portion 16Ca. The side shield 16D has the fourth end face portion 16Da.

The write shield 16 is formed of a magnetic material. For example, CoFeN, CoNiFe, FeNi, or CoFe can be used as the material of the write shield 16.

The write head unit 9 further includes a spin torque oscillator 60. The spin torque oscillator 60 is located between the main pole 15 and the trailing shield 16A in the vicinity of the medium facing surface 80 and electrically connected to the main pole 15 and the trailing shield 16A. The spin torque oscillator 60 is used to increase the recording density. The spin torque oscillator 60 may be an element configured to generate a microwave magnetic field or an element configured to adjust a permeability between the main pole 15 and the trailing shield 16A. The configuration of the spin torque oscillator 60 will be described in detail later.

The write head unit 9 further includes an upper return path section 40 and a lower return path section 30. Both the upper return path section 40 and the lower return path section 30 are formed of a magnetic material. For example, CoFeN, CoNiFe, FeNi, or CoFe can be used as the material of the upper return path section 40 and the lower return path section 30.

The upper return path section 40 is located forward relative to the main pole 15 in the direction of travel of the recording medium 90, and connects a portion of the main pole 15 located away from the medium facing surface 80 to the write shield 16, thereby magnetically coupling the main pole 15 to the write shield 16. The upper return path section 40 and the main pole 15 define an upper space USP for a portion of the coil to pass through.

The lower return path section 30 is located backward relative to the main pole 15 in the direction of travel of the recording medium 90, and connects a portion of the main pole 15 located away from the medium facing surface 80 to the write shield 16, thereby magnetically coupling the main pole 15 to the write shield 16. The lower return path section 30 and the main pole 15 define a lower space LSP for a portion of the coil to pass through.

The lower return path section 30 includes a magnetic film 31 and a magnetic layer 32. The magnetic film 31 includes a first inclined portion 31A, a first horizontal portion 31B, a second inclined portion 31C, and a second horizontal portion 31D. The first horizontal portion 31B extends in a direction perpendicular to the medium facing surface 80 (the Y direction). The first inclined portion 31A extends away from the top surface 1a of the substrate 1 from the vicinity of an end of the first horizontal portion 31B closest to the medium facing surface 80. The second inclined portion 31C extends away from the top surface 1a of the substrate 1 from the vicinity of an end of the first horizontal portion 31B farthest from the medium facing surface 80. In the main cross section, the distance between the first inclined portion 31A and the second inclined portion 31C in a direction perpendicular to the medium facing surface 80 decreases with decreasing distance to the top surface 1a of the substrate 1. The second horizontal portion 31D extends in a direction perpendicular to the medium facing surface 80 from the vicinity of an end of the second inclined portion 31C farthest from the top surface 1a of the substrate 1. In FIG. 2 the boundary between the first inclined portion 31A and the first horizontal portion 31B, the boundary between the first horizontal portion 31B and the second inclined portion 31C, and the boundary between the second inclined portion 31C and the second horizontal portion 31D are indicated by dotted lines.

The magnetic film 31 has an end face 31a located in the medium facing surface 80. The first inclined portion 31A has the end face 31a and a top surface farthest from the top surface 1a of the substrate 1. The second horizontal portion 31D has a top surface farthest from the top surface 1a of the substrate 1.

As illustrated in FIG. 2 and FIG. 4, the lower coil portion 10 is wound around the second inclined portion 31C and the second horizontal portion 31D. The lower coil portion 10 includes a coil element 11 extending to pass through the lower space LSP. The coil element refers to a portion of the winding of the coil. No portion of the coil other than the coil element 11 lies in the lower space LSP.

The write head unit 9 further includes an accommodation section 50 formed of a nonmagnetic material and accommodating at least part of the lower return path section 30. In the present embodiment, the accommodating part 50 accommodates a portion of the first inclined portion 31A, and the first horizontal portion 31B and the second inclined portion 31C, in particular. The end face 31a of the magnetic film 31 is located farther from the top surface 1a of the substrate 1 than the accommodation section 50. The accommodation section 50 is formed of an inorganic insulating material such as alumina.

The accommodation section 50 has a top surface 50a farthest from the top surface 1a of the substrate 1, and a groove 50b that opens in the top surface 50a. The portion of the first inclined portion 31A, the first horizontal portion 31B, and the second inclined portion 31C are disposed in the groove 50b. The second horizontal portion 31D extends along the top surface 50a.

The write head unit 9 further includes an insulating film 54 formed of an insulating material and separating the lower coil portion 10 from the magnetic film 31, and a first nonmagnetic layer (not illustrated) formed of a nonmagnetic material and disposed around the lower coil portion 10 and the magnetic film 31. The top surfaces of the lower coil portion 10, the first inclined portion 31A, the second horizontal portion 31D, the insulating film 54 and the first nonmagnetic layer are even with each other. The insulating film 54 and the first nonmagnetic layer are formed of alumina, for example.

The leading shield 16B is disposed on a portion of the top surface of the first inclined portion 31A. The write head unit 9 further includes an insulating layer 55 formed of an insulating material. The insulating layer 55 is disposed on another portion of the top surface of the first inclined portion 31A and on the top surfaces of the lower coil portion 10, the second horizontal portion 31D, the insulating film 54 and the first nonmagnetic layer. The insulating layer 55 includes a first portion that is in contact with the top surface of the second horizontal portion 31D and not in contact with the top surface of the lower coil portion 10, and a second portion other than the first portion. The first portion is smaller than the second portion in maximum thickness (dimension in the Z direction). The insulating layer 55 is formed of alumina, for example.

The magnetic layer 32 is disposed over the second horizontal portion 31D with the insulating layer 55 interposed therebetween. Note that the magnetic film 31 and the magnetic layer 32 magnetically couple to each other even with the insulating layer 55 interposed between the magnetic layer 32 and the second horizontal portion 31D, i.e., the magnetic film 31.

The write head unit 9 further includes a nonmagnetic layer 56 formed of a nonmagnetic material. The nonmagnetic layer 56 lies on the insulating layer 55 and surrounds the leading shield 16B and the magnetic layer 32. The nonmagnetic layer 56 is formed of alumina or silicon oxide ($SiO_2$), for example.

The side shields 16C and 16D are disposed on the leading shield 16B. The main pole 15 has the end face 15a, and also a top surface 15T (see FIG. 2) farthest from the top surface 1a of the substrate 1, a bottom end 15L (see FIG. 2) opposite to the top surface 15T, and a first side surface and a second side surface (see FIGS. 4 and 5) opposite to each other in the track width direction (the X direction). As illustrated in FIG. 3, the side shield 16C has a first sidewall opposed to a portion of the first side surface of the main pole 15 located near the medium facing surface 80. The side shield 16D has a second sidewall opposed to a portion of the second side surface of the main pole 15 located near the medium facing surface 80.

The write head unit 9 further includes a first gap layer 18 formed of a nonmagnetic material. The first gap layer 18 is disposed to extend along the first and second sidewalls of the side shields 16C and 16D, the top surface of the leading shield 16B and the top surface of the nonmagnetic layer 56.

The nonmagnetic material used to form the first gap layer 18 may be an insulating material such as alumina, for example.

As illustrated in FIG. 2, the first gap layer 18 is interposed between a portion of the bottom end 15L of the main pole 15 and the top surfaces of the leading shield 16B and the nonmagnetic layer 56. As illustrated in FIG. 3, the first gap layer 18 is interposed also between the first side surface of the main pole 15 and the first sidewall of the side shield 16C, and between the second side surface of the main pole 15 and the second sidewall of the side shield 16D.

At a location apart from the medium facing surface 80, the bottom end 15L of the main pole 15 is in contact with the top surface of the magnetic layer 32. The main pole 15 is formed of a ferromagnetic material containing one or more elements selected from Ni, Fe, and Co, such as FeNi, CoNiFe, or CoFe. The shape of the main pole 15 will be described in detail later.

The magnetic head further includes a second nonmagnetic layer (not illustrated) formed of a nonmagnetic material and disposed around the main pole 15 and the side shields 16C and 16D. The second nonmagnetic layer is formed of alumina, for example.

The spin torque oscillator 60 is disposed on and contacts the top surface 15T of the main pole 15. The spin torque oscillator 60 has an end face located in the medium facing surface 80. The end face 15a of the main pole 15 has a side adjacent to the spin torque oscillator 60, the side defining the track width.

The write head unit 9 further includes a second gap layer formed of a nonmagnetic material. The second gap layer includes a first portion 19A and a second portion 19B located on opposite sides of the spin torque oscillator 60 in the track width direction (the X direction). The first portion 19A is located on the side shield 16C and the first gap layer 18. The second portion 19B is located on the side shield 16D and the first gap layer 18. An example of the nonmagnetic material used to form the second gap layer is an insulating material such as alumina or silicon oxide.

The write head unit 9 further includes: a nonmagnetic layer 58 formed of a nonmagnetic material and disposed on a first portion of the top surface 15T of the main pole 15, the first portion being located away from the spin torque oscillator 60; an insulating layer 61 formed of an insulating material and disposed to cover the main pole 15 and the nonmagnetic layer 58; and an insulating layer 62 formed of an insulating material and disposed on the insulating layer 61. The nonmagnetic layer 58 is formed of silicon oxide, for example. The insulating layers 61 and 62 are formed of alumina, for example.

The trailing shield 16A is disposed on the side shields 16C and 16D, the first and second portions 19A and 19B of the second gap layer, the spin torque oscillator 60 and the insulating layer 62, and in contact with the top surfaces of the side shields 16C and 16D, the first and second portions 19A and 19B of the second gap layer, the spin torque oscillator 60 and the insulating layer 62. In the medium facing surface 80, a portion of the first end face portion 16Aa of the trailing shield 16A is spaced a predetermined distance away from the end face 15a of the main pole 15. The predetermined distance is preferably in the range of 5 to 60 nm, and may be 30 to 60 nm, for example.

The upper return path section 40 includes magnetic layers 41, 42, 43, and 44. The magnetic layer 41 lies on a second portion of the top surface 15T of the main pole 15, the second portion being located away from the medium facing surface 80. The second portion of the top surface 15T of the main pole 15 is located farther from the medium facing surface 80 than the first portion of the top surface 15T of the main pole 15. The magnetic layer 42 is disposed on the trailing shield 16A. The magnetic layer 42 has an end face located in the medium facing surface 80.

As illustrated in FIG. 5, the upper coil portion 20 is wound around the magnetic layer 43. The write head unit 9 further includes: an insulating film 63 formed of an insulating material and separating at least part of the upper coil portion 20 from the trailing shield 16A, the magnetic layers 42 and 43, and the insulating layer 62; a third nonmagnetic layer (not illustrated) formed of a nonmagnetic material and disposed around the trailing shield 16A and the magnetic layer 41; and a fourth nonmagnetic layer (not illustrated) formed of a nonmagnetic material and disposed around the upper coil portion 20 and the magnetic layer 42. The insulating film 63, the third nonmagnetic layer, and the fourth nonmagnetic layer are formed of alumina, for example.

The write head unit 9 further includes an insulating layer 64 formed of an insulating material and disposed on the upper coil portion 20, the magnetic layer 43 and the insulating film 63. The insulating layer 64 includes a first portion lying on the upper coil portion 20 and a second portion lying on the magnetic layer 41. The second second portion is smaller than the first portion in maximum thickness (dimension in the Z direction).

The magnetic layer 44 is disposed on the magnetic layer 42 and the insulating layer 64. The magnetic layer 44 has an end face located in the medium facing surface 80. The magnetic layer 44 includes a first portion lying on the magnetic layer 42, a second portion lying over the magnetic layer 43 with the insulating layer 64 interposed therebetween, and a third portion connecting the first and second portions. Note that the magnetic layer 43 and the magnetic layer 44 magnetically couple to each other even with the insulating layer 64 interposed between the magnetic layer 43 and the second portion of the magnetic layer 44.

The magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located forward relative to the read head unit 8 in the direction of travel of the recording medium 90 (the Z direction).

The write head unit 9 includes the coil including the upper coil portion 20 and the lower coil portion 10, the main pole 15, the write shield 16, the upper return path section 40, the lower return path section 30, the accommodation section 50, and the spin torque oscillator 60. The coil, the main pole 15, the write shield 16, the upper return path section 40, the lower return path section 30, the accommodation section 50, and the spin torque oscillator 60 are located above the top surface 1a of the substrate 1. The write shield 16 includes the trailing shield 16A, the leading shield 16B, and the side shields 16C and 16D.

The upper return path section 40 includes the magnetic layers 41 to 44, and is located forward relative to the main pole 15 in the direction of travel of the recording medium 90. As illustrated in FIG. 2, the upper return path section 40 connects a portion of the main pole 15 located away from the medium facing surface 80 to the write shield 16 so that the upper space USP is defined by the main pole 15, the write shield 16 and the upper return path section 40 (the magnetic layers 41 to 44).

The lower return path section 30 includes the magnetic film 31 and the magnetic layer 32, and is located backward relative to the main pole 15 in the direction of travel of the recording medium 90 and between the main pole 15 and the top surface 1a of the substrate 1. As illustrated in FIG. 2, the lower return path section 30 connects a portion of the main pole 15 located away from the medium facing surface 80 to the write shield 16 so that the lower space LSP is defined by the main pole 15, the write shield 16 and the lower return path section 30 (the magnetic film 31 and the magnetic layer 32).

The accommodation section 50 accommodates at least part of the lower return path section 30. Specifically, a portion of the magnetic film 31 constituting a portion of the lower return path section 30 lies in the groove 50b of the accommodation section 50. The magnetic film 31 includes the first inclined portion 31A, the first horizontal portion 31B, the second inclined portion 31C and the second horizontal portion 31D. Since the magnetic film 31 is part of the lower return path section 30, the lower return path section 30 can be said to include the first inclined portion 31A, the first horizontal portion 31B, the second inclined portion 31C and the second horizontal portion 31D.

The write shield 16 captures a disturbance magnetic field applied to the magnetic head from outside the magnetic head. This can prevent erroneous writing on the recording medium 90 that would be caused by the disturbance magnetic field being intensively captured into the main pole 15. The write shield 16 further has the function of capturing a magnetic flux that is generated from the end face 15a of the main pole 15 and spreads in directions other than the direction perpendicular to the plane of the recording medium 90, and thereby preventing the magnetic flux from reaching the recording medium 90. Furthermore, the write shield 16, the upper return path section 40 and the lower return path section 30 have the function of allowing a magnetic flux that has been generated from the end face 15a of the main pole 15 and has magnetized a portion of the recording medium 90 to flow back.

The spin torque oscillator 60 is electrically connected to the main pole 15 and the trailing shield 16A. As illustrated in FIG. 2, the magnetic head further includes two terminals 81 and 82 connected to a power source (not illustrated), wiring 83 for electrically connecting the terminal 81 and the main pole 15, and wiring 84 for electrically connecting the terminal 82 and the magnetic layer 44. The trailing shield 16A is electrically connected to the magnetic layer 44 via the magnetic layer 42. A current for operating the spin torque oscillator 60, which will hereinafter be referred to as a driving current, is supplied via the terminals 81 and 82. The driving current flows through the main pole 15, the spin torque oscillator 60, the trailing shield 16A, the magnetic layer 42, and the magnetic layer 44 in this order.

Figure 6:
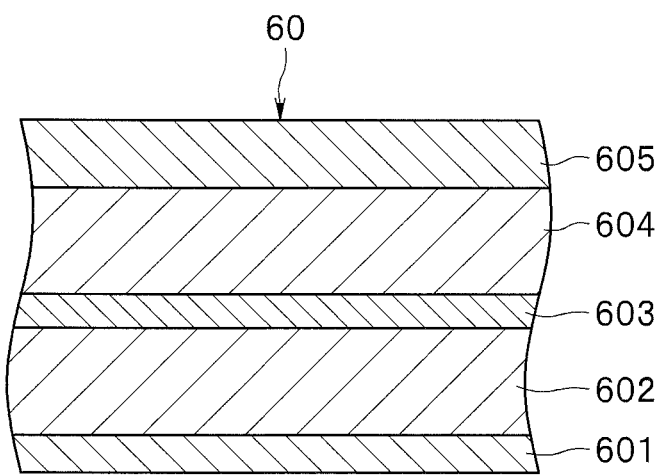
FIG. 6 is a cross-sectional view illustrating an example of a spin torque oscillator of the magnetic head according to the first embodiment of the invention.

Reference is now made to FIG. 6 to describe a configuration of the spin torque oscillator 60. FIG. 6 is a cross-sectional view illustrating an example of configuration of the spin torque oscillator 60. The spin torque oscillator 60 illustrated in FIG. 6 is one configured to generate a microwave magnetic field. This spin torque oscillator 60 includes an underlayer 601, a magnetic-field generating layer 602, a nonmagnetic layer 603, a spin injection layer 604, and a protective layer 605 stacked in this order, from closest to farthest from the main pole 15.

The underlayer 601 and the protective layer 605 are each formed of a nonmagnetic metal material. For example, the underlayer 601 and the protective layer 605 are each formed of one of Ta, Al, Ti, Mn, Fe, Co, Ni, Cu, Zn, Zr, Nb, Mo, Ru, Rh, Pd, Ag, Hf, W, Ir, Pt, and Au, or an alloy composed of two or more of these elements.

The magnetic-field generating layer 602 is formed of a material whose magnetization direction is parallel or almost parallel to the film plane when no driving current flows. The magnetic-field generating layer 602 may be a magnetic layer formed of one of FeCo, FeCoAl, FeCoSi, FeCoB, and FeNi, a layered film composed of alternately stacked layers of FeCo and Ni, or a layered film composed of alternately stacked layers of Fe and Co.

The nonmagnetic layer 603 is formed of a material having high spin permeability. The nonmagnetic layer 603 may be a nonmagnetic metal layer formed of one of Ag, Au, Cr, and Al, or a tunnel barrier layer formed of MgO or $Al_2O_3$.

The spin injection layer 604 is formed of a material having magnetic anisotropy in a direction perpendicular to the film plane. The spin injection layer 604 may be a layered film composed of alternately stacked layers of CoFe and Ni, a layered film composed of alternately stacked layers of Co and Pt, a layered film composed of alternately stacked layers of Co and Pd, or an alloy layer formed of one of CoPt, FePt, and MnGa.

In the spin torque oscillator 60 illustrated in FIG. 6, passing a driving current in the direction from the underlayer 601 to the protective layer 605 imparts a spin torque to the magnetization of the magnetic-field generating layer 602 to cause precession of the magnetization of the magnetic-field generating layer 602. As a result, a microwave magnetic field is generated from the magnetic-field generating layer 602.

The shape of the main pole 15 will now be described in detail with reference to FIG. 2 to FIG. 5. As illustrated in FIG. 3, the end face 15a of the main pole 15 has a top edge farthest from the top surface 1a of the substrate 1, a first side edge connected to one end of the top edge, and a second side edge connected to the other end of the top edge. In the present embodiment, specifically, the top edge is in contact with the spin torque oscillator 60. The top edge defines the track width. The position of an end of a recording bit to be recorded on the recording medium 90 is determined by the position of the top edge. The width of the end face 15a of the main pole 15 in the track width direction decreases with increasing distance from the top edge, i.e., with decreasing distance to the top surface 1a of the substrate 1. Each of the first side edge and the second side edge forms an angle in the range of, for example, 7° to 17°, preferably 10° to 15°, with respect to a direction perpendicular to the top surface 1a of the substrate 1. The top edge has a length in the range of 0.05 to 0.20 µm, for example.

As illustrated in FIG. 4 and FIG. 5, the main pole 15 includes a track width defining portion 15A having the end face 15a and an end opposite thereto, and a wide portion 15B connected to the end of the track width defining portion 15A. The main pole 15 has the top surface 15T, the bottom end 15L, the first side surface and the second side surface. Hereinafter, a width in the track width direction (the X direction) will be simply referred to as a width. The width of the top surface 15T is greater in the wide portion 15B than in the track width defining portion 15A. The width of the top surface 15T in the track width defining portion 15A gradually increases with increasing distance from the medium facing surface 80, and then becomes constant.

As illustrated in FIG. 2, the top surface 15T includes a first inclined portion and a first flat portion arranged in this order, the first inclined portion being located closer to the medium facing surface 80 than the first flat portion. The first inclined portion has a first end located in the medium facing surface 80 and a second end opposite thereto. The first flat portion is connected to the second end of the first inclined portion. The first inclined portion is inclined such that the second end is located forward relative to the first end in the direction of travel of the recording medium 90 (the Z direction). The first flat portion extends substantially in a direction perpendicular to the medium facing surface 80 (the Y direction).

As illustrated in FIG. 2, the bottom end 15L includes a second inclined portion and a second flat portion arranged in this order, the second inclined portion being located closer to the medium facing surface 80 than the second flat portion. The second inclined portion has a third end located in the medium facing surface 80, and a fourth end opposite thereto. The second inclined portion may be an edge formed by two intersecting surfaces, or may be a surface connecting two surfaces to each other. The second flat portion is a surface connected to the fourth end of the second inclined portion. The second inclined portion is inclined such that the fourth end is located backward relative to the third end in the direction of travel of the recording medium 90 (the Z direction). The second flat portion extends substantially in a direction perpendicular to the medium facing surface 80 (the Y direction).

As illustrated in FIG. 2, the bottom end 15L further includes a third inclined portion and a third flat portion. The third inclined portion is a surface connected to the second flat portion. The third flat portion is a surface connected to an end of the third inclined portion, the end being opposite from the second flat portion. The third inclined portion is inclined in a manner similar to that in which the second inclined portion is inclined. The third flat portion extends substantially in a direction perpendicular to the medium facing surface 80 (the Y direction), like the second flat portion.

Reference is now made to FIG. 4 and FIG. 5 to describe the connection relationship between the upper coil portion 20 and the lower coil portion 10 of the coil. As illustrated in FIG. 4, the lower coil portion 10 has a coil connection 10E electrically connected to the upper coil portion 20. As illustrated in FIG. 5, the upper coil portion 20 has a coil connection 20S electrically connected to the coil connection 10E of the lower coil portion 10. The coil connection 20S is electrically connected to the coil connection 10E via first to third connection layers of columnar shape (not illustrated) that penetrate a plurality of layers interposed between the upper coil portion 20 and the lower coil portion 10. The first to third connection layers are stacked in order on the coil connection 10E. The coil connection 20S lies on the third connection layer. The first to third connection layers are formed of a conductive material such as copper. In the example illustrated in FIG. 4 and FIG. 5, the upper coil portion 20 and the lower coil portion 10 are connected in series.

Figure 1:
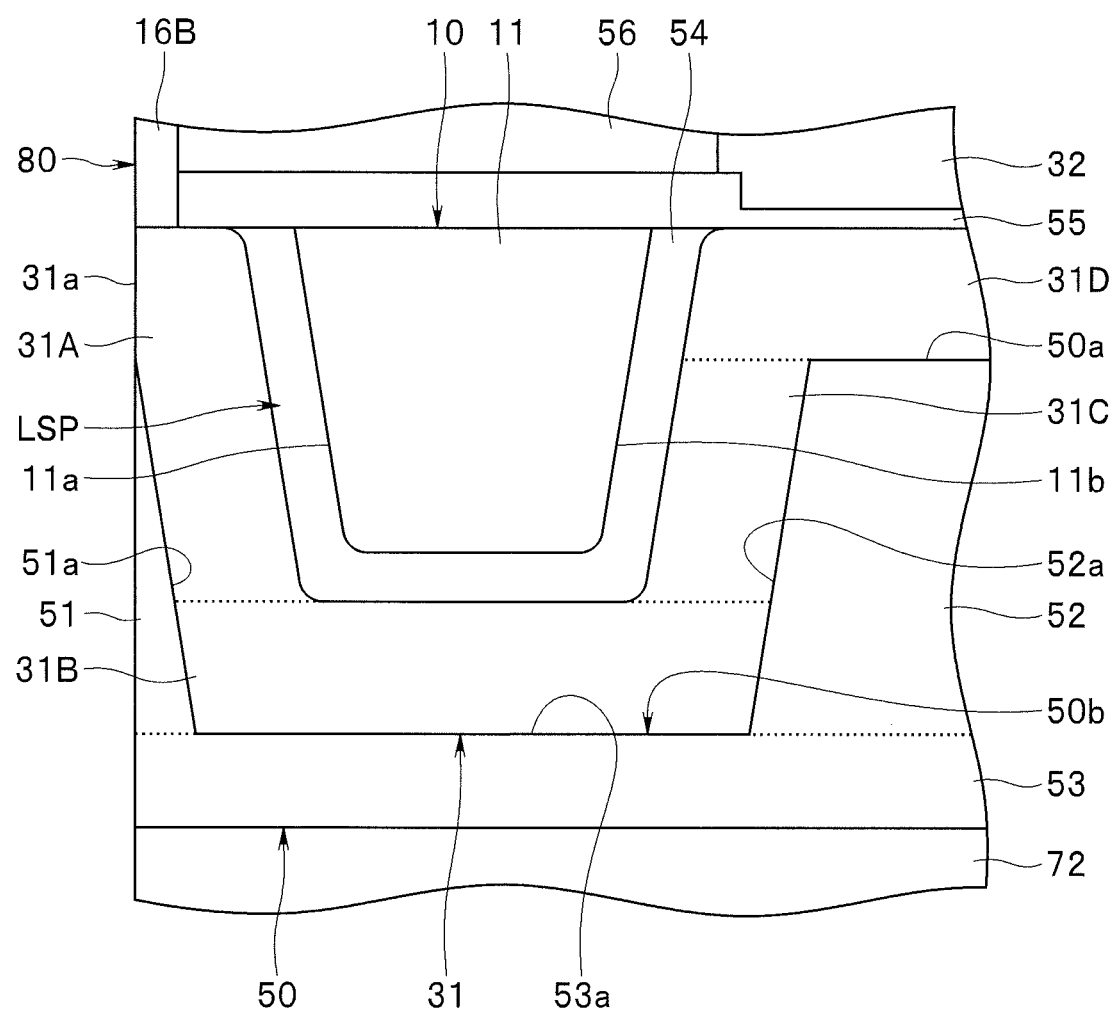
FIG. 1 is a cross-sectional view illustrating essential parts of a magnetic head according to a first embodiment of the invention.

Now, the shapes and layout of the coil, the lower return path section 30 and the accommodation section 50 will be described in detail with reference to FIG. 1. FIG. 1 is a cross-sectional view illustrating essential parts of the magnetic head. As described above, the lower coil portion 10 of the coil includes the coil element 11 extending to pass through the lower space LSP. Since the lower coil portion 10 is a portion of the coil, the coil can be said to include the coil element 11.

The accommodation section 50 includes a first portion 51, a second portion 52 and a third portion 53. The first portion 51 is located closer to the medium facing surface 80 than the coil element 11, and interposed between the lower return path section 30 and the medium facing surface 80. The second portion 52 is located farther from the medium facing surface 80 than the coil element 11. The third portion 53 is located between the lower return path section 30 and the top surface 1a (see FIG. 2 and FIG. 3) of the substrate 1. In FIG. 1, the boundary between the first portion 51 and the third portion 53 and the boundary between the second portion 52 and the third portion 53 are indicated in dotted lines.

The maximum dimension of the first portion 51 in a direction perpendicular to the medium facing surface 80 (the Y direction) is in the range of, for example, 0.1 to 0.4 µm, preferably 0.3 µm or smaller.

The first portion 51 has a first inclined surface 51a facing the lower return path section 30. The first inclined surface 51a also serves as a portion of the wall face of the groove 50b of the accommodation section 50. The second portion 52 has a second inclined surface 52a facing the lower return path section 30. The second inclined surface 52a also serves as another portion of the wall face of the groove 50b of the accommodation section 50. The coil element 11 has a third inclined surface 1a facing the first inclined surface 51a, and a fourth inclined surface 11b facing the second inclined surface 52a.

Each of the first inclined surface 51a, the second inclined surface 52a, the third inclined surface 11a and the fourth inclined surface 11b has a top end farthest from the top surface 1a of the substrate 1, and a bottom end closest to the top surface 1a of the substrate 1. The first inclined surface 51a and the third inclined surface 11a are each inclined with respect to the medium facing surface 80 such that the distance from the medium facing surface 80 to the bottom end is greater than the distance from the medium facing surface 80 to the top end. The second inclined surface 52a and the fourth inclined surface 11b are each inclined with respect to the medium facing surface 80 such that the distance from the medium facing surface 80 to the bottom end is smaller than the distance from the medium facing surface 80 to the top end. The first inclined surface 51a, the second inclined surface 52a, the third inclined surface 11a and the fourth inclined surface 11b are each inclined with respect to a direction perpendicular to the top surface 1a of the substrate 1.

In the main cross section, the distance between the first inclined surface 51a and the second inclined surface 52a in a direction perpendicular to the medium facing surface 80 (the Y direction) decreases with decreasing distance to the top surface 1a of the substrate 1. Each of the first and second inclined surfaces 51a and 52a preferably forms an angle in the range of 5° to 45°, more preferably in the range of 8° to 16°, with respect to the medium facing surface 80.

Similarly, in the main cross section, the distance between the third inclined surface 11a and the fourth inclined surface 11b in a direction perpendicular to the medium facing surface 80 (the Y direction) decreases with decreasing distance to the top surface 1a of the substrate 1. Each of the third and fourth inclined surfaces 11a and 11b preferably forms an angle in the range of 5° to 45°, more preferably in the range of 8° to 16°, with respect to the medium facing surface 80.

The third portion 53 has a connecting surface 53a connecting the first inclined surface 51a of the first portion 51 and the second inclined surface 52a of the second portion 52. The connecting surface 53a also serves as the bottom surface of the groove 50b of the accommodation section 50. The magnetic film 31 of the lower return path section 30 extends along the first inclined surface 51a, the connection surface 53a and the second inclined surface 52a, and along the top surface of the accommodation section 50. The magnetic film 31 has a thickness in the range of, for example, 0.3 to 0.6 μm.

The first inclined portion 31A of the magnetic film 31 is located between the first inclined surface 51a and the third inclined surface 11a and extends along the first inclined surface 51a. In the present embodiment, the first inclined portion 31A extends further along the third inclined surface 11a.

The second inclined portion 31C of the magnetic film 31 is located between the second inclined surface 52a and the fourth inclined surface 11b and extends along the second inclined surface 52a. In the present embodiment, the second inclined portion 31C extends further along the fourth inclined surface 11b.

A manufacturing method of the magnetic head according to the present embodiment will now be described. The manufacturing method of the magnetic head according to the present embodiment starts with forming the insulating layer 2, the first read shield layer 3, and the MR element 5 in this order on the substrate 1, as illustrated in FIG. 2 and FIG. 3. Next, the insulating layer 6 is formed around the MR element 5. The second read shield layer 7, the nonmagnetic layer 71, and the middle shield layer 72 are then formed in this order over the MR element 5 and the insulating layer 6.

Reference is now made to FIG. 7 to FIG. 16 to describe a series of steps to follow the foregoing step. FIG. 7 to FIG. 16 each illustrate a stack of layers formed in the process of manufacturing the magnetic head. FIG. 7 to FIG. 16 omit the illustration of portions that are closer to the substrate 1 relative to the accommodation section 50 to be formed later. FIG. 7 to FIG. 16 each illustrate a cross section perpendicular to the medium facing surface 80 and the top surface 1a of the substrate 1. In FIG. 7 to FIG. 16, the symbol ABS represents the position where the medium facing surface 80 is to be formed.

Figure 7:
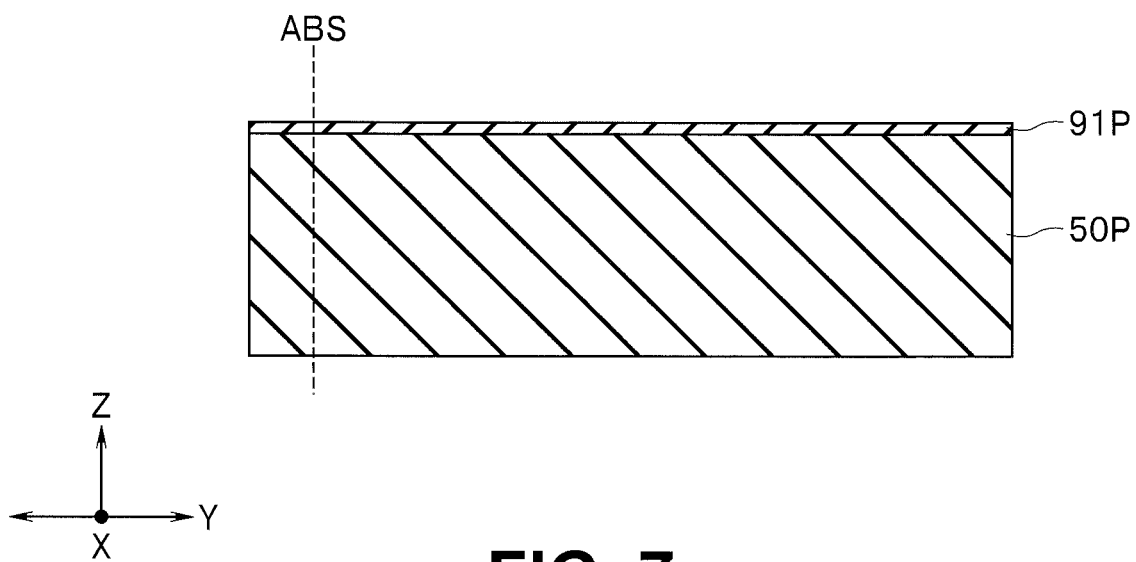
FIG. 7 is a cross-sectional view illustrating a step of a manufacturing method of the magnetic head according to the first embodiment of the invention.

FIG. 7 illustrates a step following the formation of the middle shield layer 72. In this step, first, an initial accommodation section 50P, which is to later become the accommodation section 50, is formed on the middle shield layer 72. Next, an etching mask material layer 91P is formed on the initial accommodation section 50P. The etching mask material layer 91P is formed of, for example, samarium oxide (SmOx), where x represents any number greater than 0.

Figure 8:
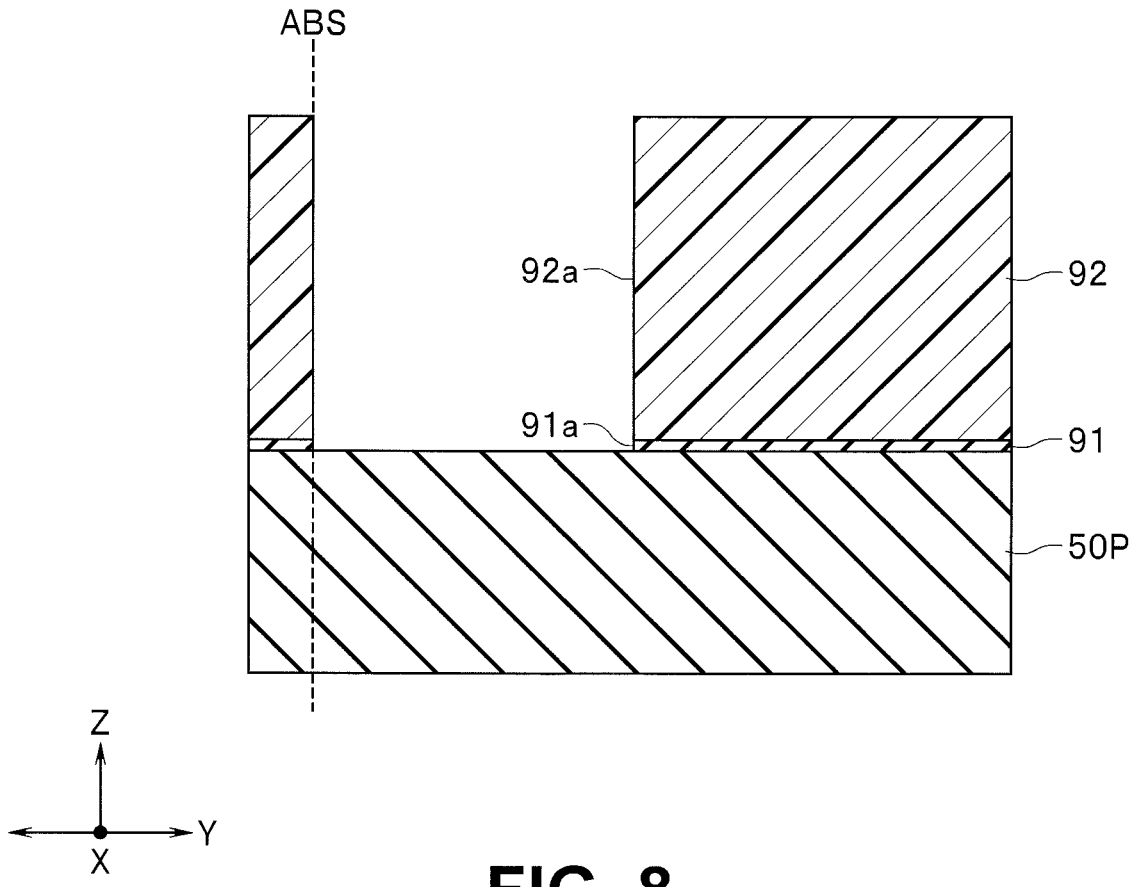
FIG. 8 is a cross-sectional view illustrating a step that follows the step illustrated in FIG. 7.

FIG. 8 illustrates the next step. In this step, first, a photoresist mask 92 is formed on the etching mask material layer 91P. The photoresist mask 92 has an opening 92a shaped to correspond to the plane shape (the shape as viewed from above) of the groove 50b of the accommodation section 50 to be formed later. The photoresist mask 92 is formed by patterning a photoresist layer. Next, a portion of the etching mask material layer 91P that is exposed from the opening 92a of the photoresist mask 92 is removed by, for example, ion beam etching (hereinafter referred to as IBE) using the photoresist mask 92 as an etching mask. This makes the etching mask material layer 91P into an etching mask 91. The etching mask 91 has an opening 91a shaped to correspond to the plane shape of the grove 50b of the accommodation section 50 to be formed later.

Figure 9:
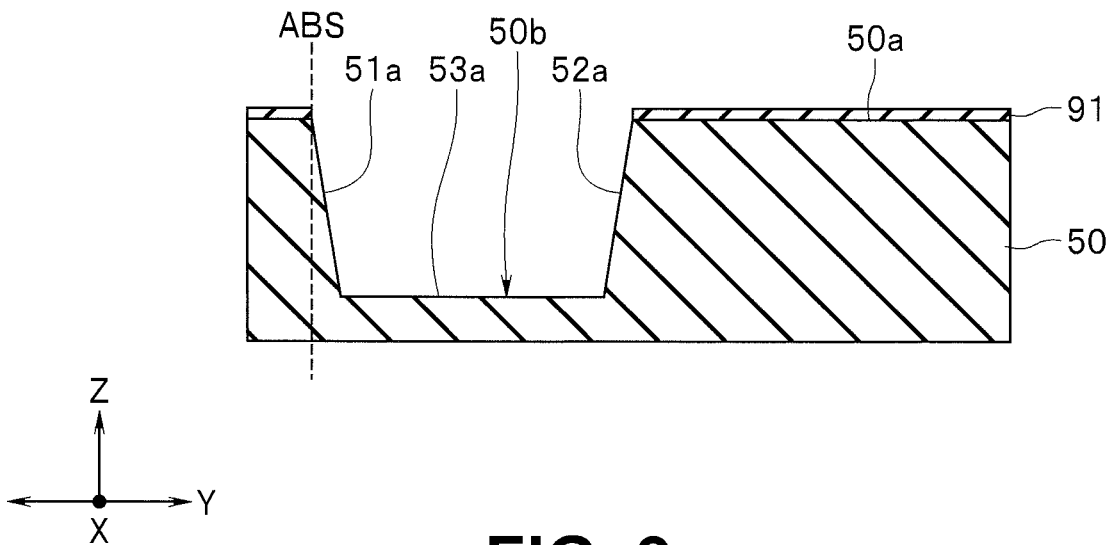
FIG. 9 is a cross-sectional view illustrating a step that follows the step illustrated in FIG. 8.

FIG. 9 illustrates the next step. In this step, first, the initial accommodation section 50P is taper-etched by, for example, reactive ion etching (hereinafter referred to as RIE) using the etching mask 91 and the photoresist mask 92 as an etching mask to thereby form the groove 50b of the accommodation section 50 in the initial accommodation section 50P. This makes the initial accommodation section 50P into the accommodation section 50. A portion of the top surface of the initial accommodation section 50P that remains after the etching becomes the top surface 50a of the accommodation section 50. Then, the etching mask 91 and the photoresist mask 92 are removed.

In the case where the initial accommodation section 50P is formed of alumina, the taper-etching of the initial accommodation section 50P in the foregoing etching step is performed by RIE with an etching gas containing, for example, $BCl_3$ and $N_2$. $BCl_3$ is a main component contributing to the etching of the initial accommodation section 50P. $N_2$ is a gas for forming, during the etching of the initial accommodation section 50P, a sidewall-protecting film on the sidewall of the groove formed by the etching. The etching gas containing $N_2$ serves to form the sidewall-protecting film on the sidewall of the groove during the etching of the initial accommodation section 50P, thereby causing a portion of the wall face of the groove 50b including the first inclined surface 51a and another portion of the wall face of the groove 50b including the second inclined surface 52a to become inclined surfaces each forming an angle with respect to the medium facing surface 80 to be formed later.

Figure 10:
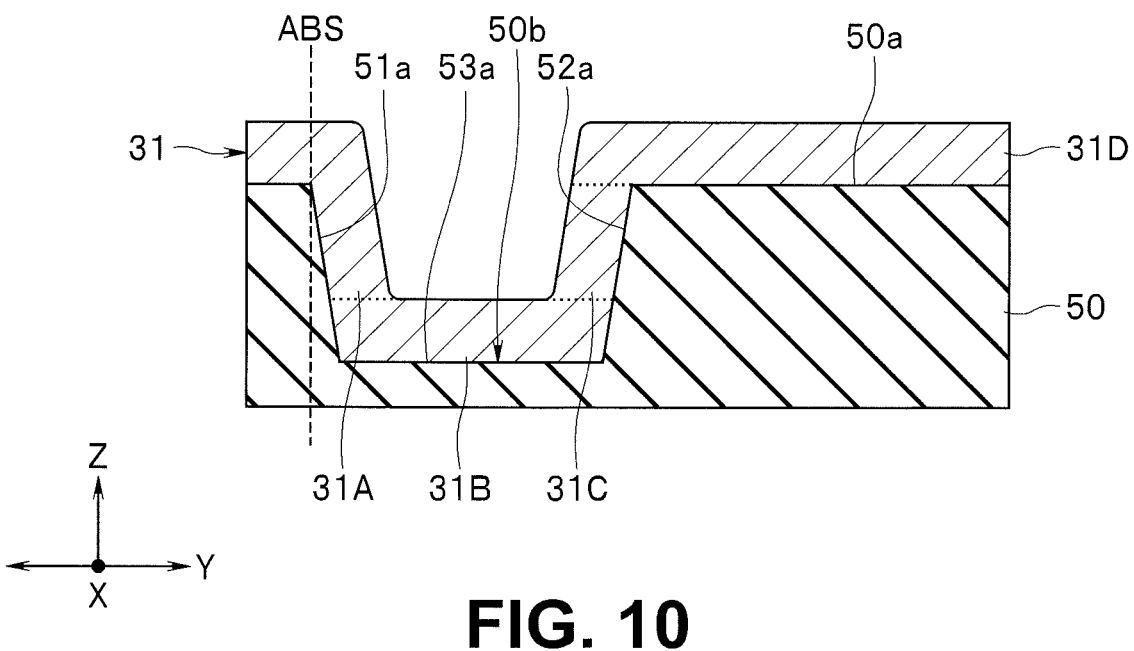
FIG. 10 is a cross-sectional view illustrating a step that follows the step illustrated in FIG. 9.

FIG. 10 illustrates the next step. In this step, the magnetic film 31 is formed by frame plating, for example. In this step, the first inclined portion 31A, the first horizontal portion 31B, the second inclined portion 31C and the second horizontal portion 31D are formed from the same material simultaneously. The first inclined portion 31A, the first horizontal portion 31B, the second inclined portion 31C and the second horizontal portion 31D are formed into the same or almost the same thickness.

Figure 11:
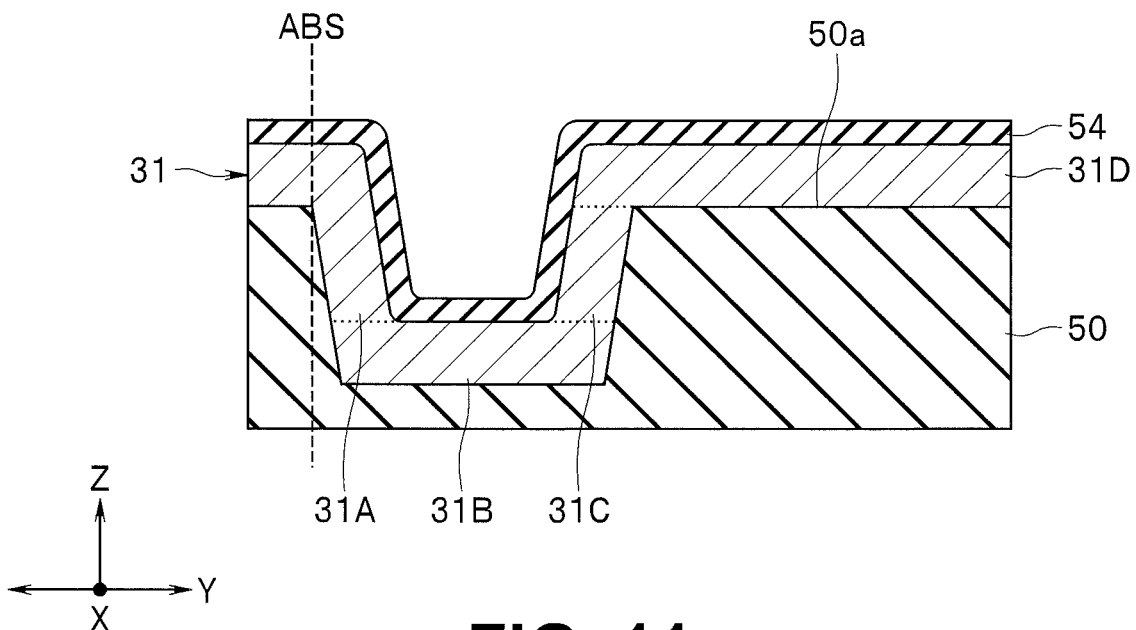
FIG. 11 is a cross-sectional view illustrating a step that follows the step illustrated in FIG. 10.

FIG. 11 illustrates the next step. In this step, the insulating film 54 is formed over the entire top surface of the stack. In the case of using alumina as the material of the insulating film 54, the insulating film 54 is formed by atomic layer deposition (hereinafter referred to as ALD), for example. The insulating film 54 has a thickness in the range of 0.1 to 0.2 μm, for example.

Figure 12:
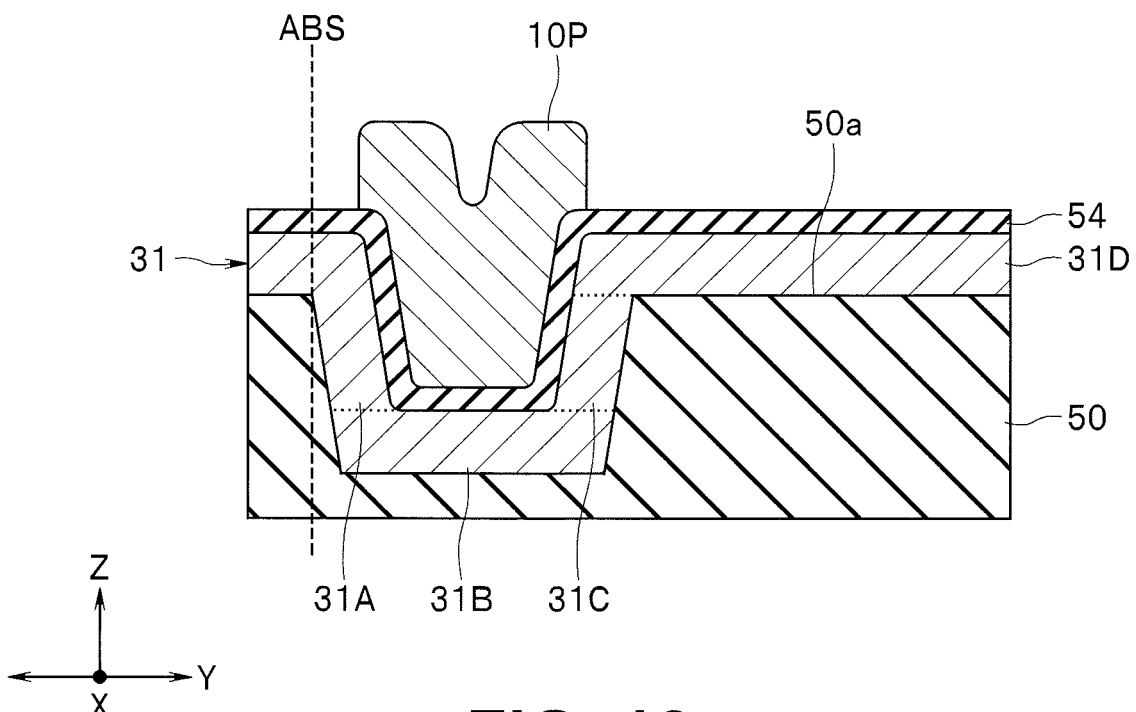
FIG. 12 is a cross-sectional view illustrating a step that follows the step illustrated in FIG. 11.

FIG. 12 illustrates the next step. In this step, a conductive layer 10P, which is to later become the lower coil portion 10 of the coil, is formed on the insulating film 54 by frame plating, for example. The conductive layer 10P is formed such that a portion thereof rides over a portion of the insulating film 54 that lies above the top surface 50a of the accommodation section 50.

Figure 13:
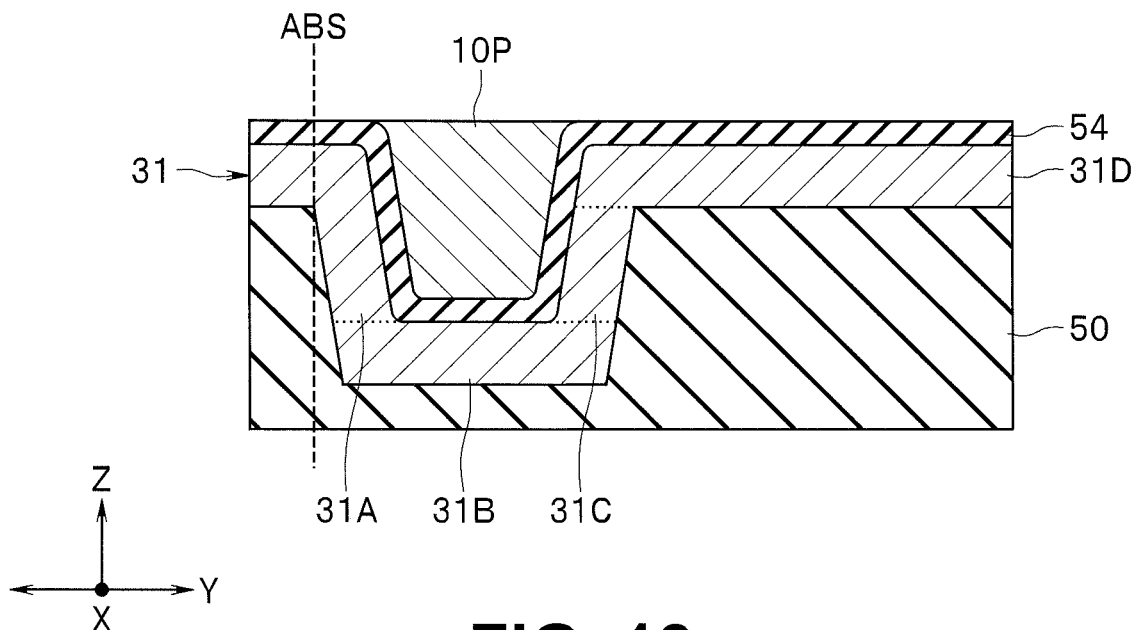
FIG. 13 is a cross-sectional view illustrating a step that follows the step illustrated in FIG. 12.

FIG. 13 illustrates the next step. In this step, first, the non-illustrated first nonmagnetic layer is formed over the entire top surface of the stack. The conductive layer 10P and the non-illustrated first nonmagnetic layer are then polished by, for example, chemical mechanical polishing (hereinafter referred to as CMP), until the insulating film 54 is exposed.

Figure 14:
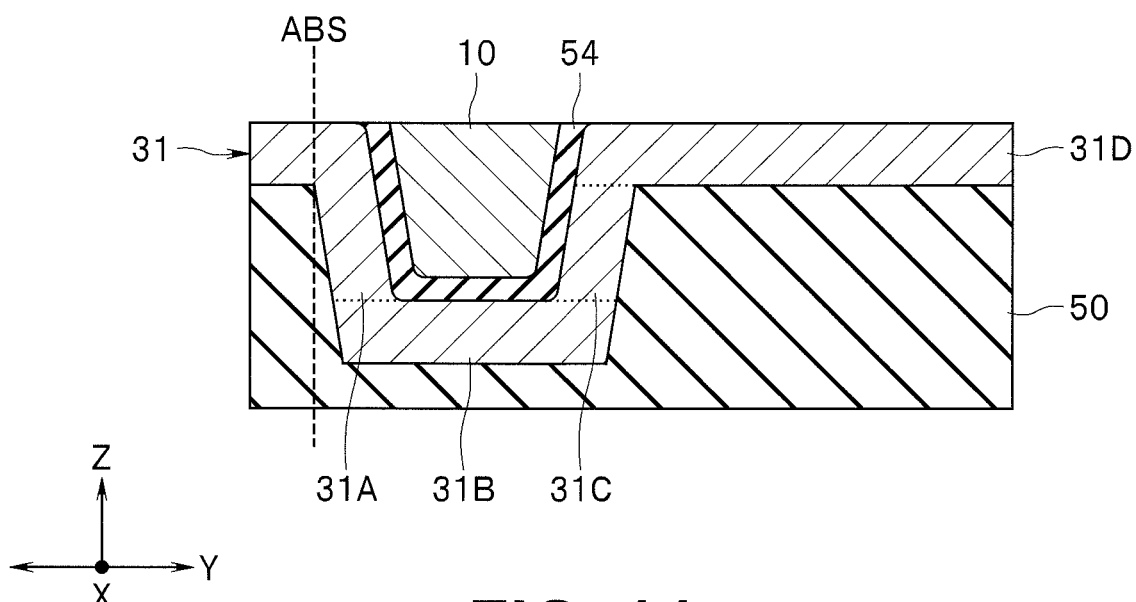
FIG. 14 is a cross-sectional view illustrating a step that follows the step illustrated in FIG. 13.

FIG. 14 illustrates the next step. In this step, the conductive layer 10P, the insulating film 54 and the non-illustrated first nonmagnetic layer are etched by, for example, IBE until the magnetic film 31 is exposed. This makes the conductive layer 10P into the lower coil portion 10.

Figure 15:
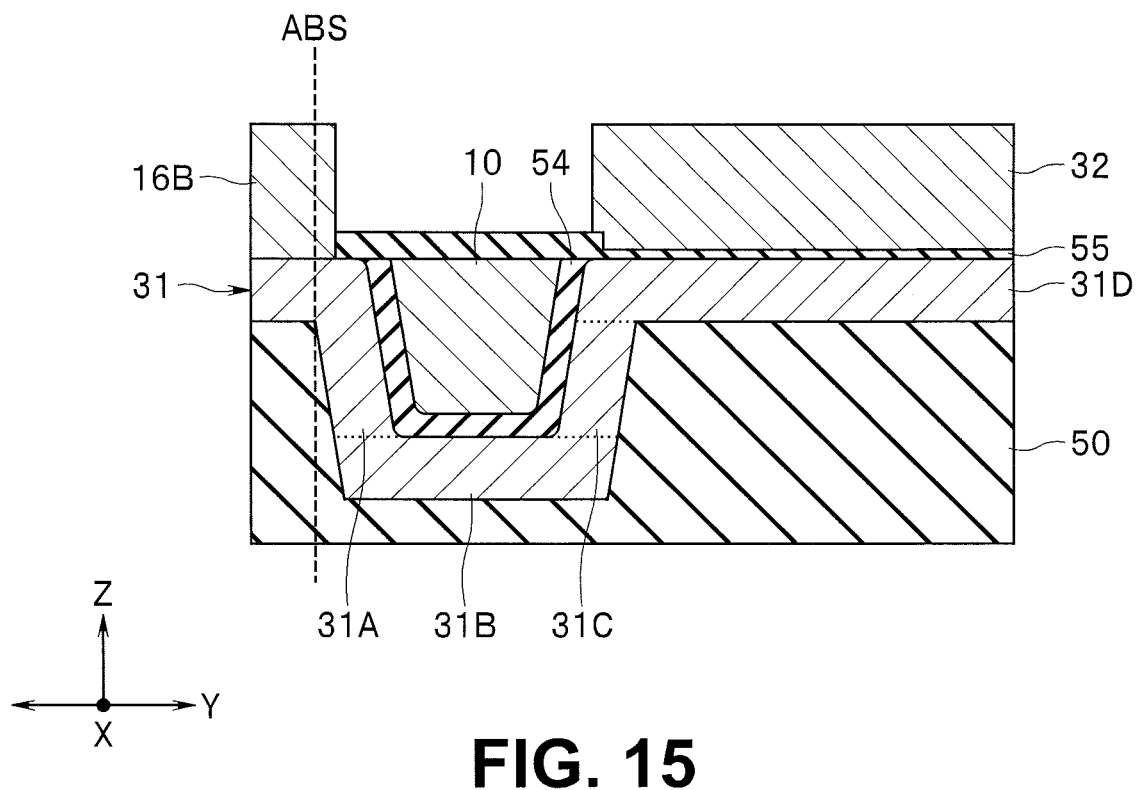
FIG. 15 is a cross-sectional view illustrating a step that follows the step illustrated in FIG. 14.

FIG. 15 illustrates the next step. In this step, first, the insulating layer 55 is formed over the entire top surface of the stack. The insulating layer 55 is then selectively etched to form therein a first opening for exposing a portion of the top surface of the first inclined portion 31A of the magnetic film 31 and a second opening for exposing the coil connection 10E (see FIG. 4) of the lower coil portion 10. Further, the insulating layer 55 is subjected to selective etching to etch the top surface of a portion of the insulating layer 55 covering the top surface of the second horizontal portion 31D of the magnetic film 31. Then, the leading shield 16B is formed on the first inclined portion 31A at the position of the first opening, the magnetic layer 32 is formed on the portion of the insulating layer 55 covering the top surface of the second horizontal portion 31D, and the non-illustrated first connection layer is formed on the coil connection 10E at the position of the second opening, by performing frame plating, for example.

Figure 16:
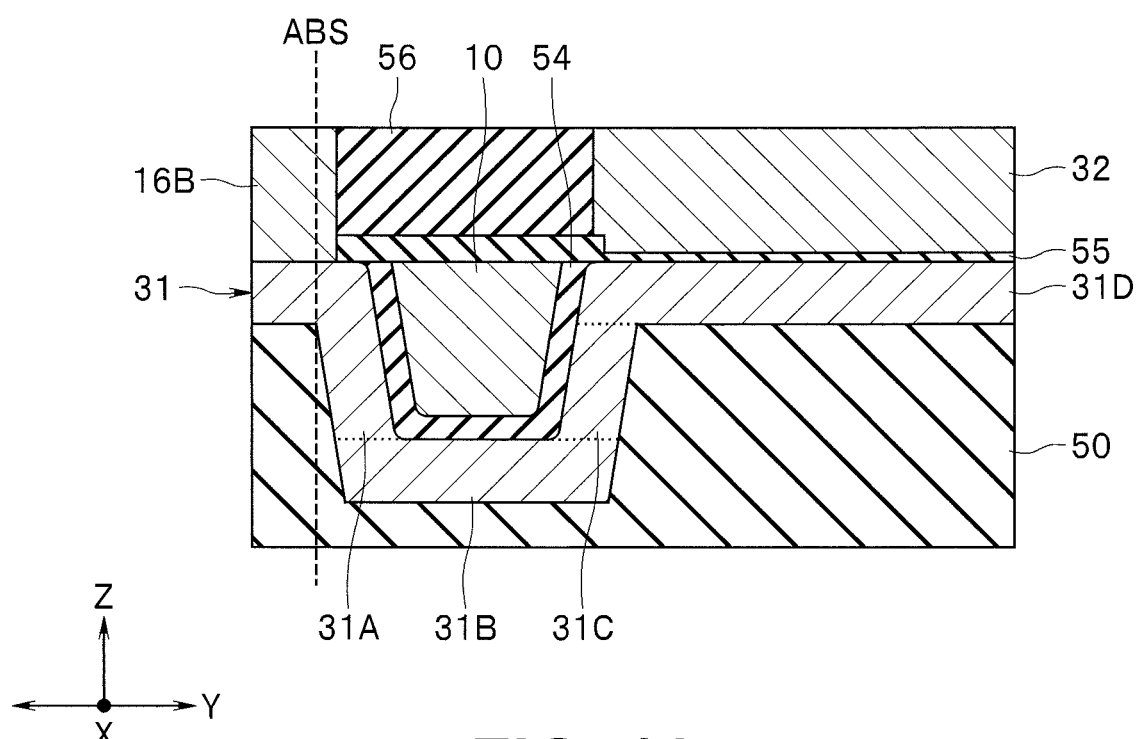
FIG. 16 is a cross-sectional view illustrating a step that follows the step illustrated in FIG. 15.

FIG. 16 illustrates the next step. In this step, first, the nonmagnetic layer 56 is formed over the entire top surface of the stack. The nonmagnetic layer 56 is then polished by, for example, CMP, until the leading shield 16B, the magnetic layer 32 and the first connection layer are exposed.

Now, steps to follow the polishing of the nonmagnetic layer 56 will be described with reference to FIG. 2 and FIG. 3. First, the leading shield 16B and the nonmagnetic layer 56 are taper-etched in part by, for example, IBE so as to provide the top surface of the leading shield 16B with a portion opposed to the second inclined portion of the bottom end 15L of the main pole 15 to be formed later, and provide the top surface of the nonmagnetic layer 56 with a portion opposed to the third inclined portion of the bottom end 15L of the main pole 15 to be formed later. In this etching, the magnetic layer 32 and the first connection layer are also etched in part.

Next, the side shields 16C and 16D are formed on the leading shield 16B by, for example, frame plating. The first gap layer 18 is then formed to cover the leading shield 16B and the side shields 16C and 16D. The first gap layer 18 is then selectively etched to form therein an opening for exposing the top surface of the magnetic layer 32 and an opening for exposing the top surface of the first connection layer. Next, an initial main pole, which is to later become the main pole 15, and the non-illustrated second connection layer are formed by frame plating, for example. The initial main pole and the second connection layer are formed such that their top surfaces are higher in level than portions of the first gap layer 18 that are located on the side shields 16D and 16D.

Next, the non-illustrated second nonmagnetic layer is formed over the entire top surface of the stack. The initial main pole, the second connection layer, the first gap layer 18 and the second nonmagnetic layer are then polished by, for example, CMP until the side shields 16C and 16D are exposed. Next, the nonmagnetic layer 58 is formed on the initial main pole. The initial main pole and the nonmagnetic layer 58 are then taper-etched so as to provide the initial main pole with the first inclined portion of the top surface 15T of the main pole 15. This makes the initial main pole into the main pole 15. The side shields 16C and 16D, the first gap layer 18 and the second nonmagnetic layer are also etched in part by this etching.

Next, a layered film that is to later become the spin torque oscillator 60 is formed on the stack including the main pole 15. As in the example illustrated in FIG. 6, the spin torque oscillator 60 is composed of a plurality of layers. The layered film includes all the layers to constitute the spin torque oscillator 60. Next, the layered film is patterned by, for example, IBE so as to provide the layered film with the two side surfaces of the spin torque oscillator 60 that are opposite to each other in the track width direction (the X direction). Next, an initial gap layer, which is to later become the second gap layer, is formed on opposite sides of the layered film in the track width direction. The layered film is then patterned by, for example, IBE so as to make the layered film into the spin torque oscillator 60. The layered film thus becomes the spin torque oscillator 60.

Next, the insulating layer 61 is formed by a lift-off method, for example. Then, the insulating layer 62 is formed on the insulating layer 61. The insulating layer 62 may be formed by a lift-off method or by initially forming an insulating film on the insulating layer 61 and then etching a portion of the insulating film. Next, the initial gap layer is selectively etched so that the top surfaces of the side shields 16C and 16D are exposed in part. This forms the first and second portions 19A and 19B of the second gap layer.

Next, the nonmagnetic layer 58 and the insulating layers 61 and 62 are selectively etched by, for example, IBE so that the second portion of the top surface 15T of the main pole 15 and the top surface of the second connection layer are exposed. Then, the trailing shield 16A is formed on the side shields 16C and 16D, the first and second portions 19A and 19B of the second gap layer, the spin torque oscillator 60 and the insulating layer 62; the magnetic layer 41 is formed on the main pole 15; and the non-illustrated third connection layer is formed on the second connection layer, by performing frame plating, for example.

Next, the non-illustrated third nonmagnetic layer is formed over the entire top surface of the stack. The third nonmagnetic layer is then polished by, for example, CMP until the trailing shield 16A, the magnetic layer 41 and the third connection layer are exposed. Then, the magnetic layer 42 is formed on the trailing shield 16A, and the magnetic layer 43 is formed on the magnetic layer 41, by performing frame plating, for example.

Next, the insulating film 63 is formed over the entire top surface of the stack. The insulating film 63 is then selectively etched to form therein an opening for exposing the top surface of the third connection layer. Next, the upper coil portion 20 of the coil is formed by frame plating, for example. The non-illustrated fourth nonmagnetic layer is then formed over the entire top surface of the stack. The insulating film 63 and the fourth nonmagnetic layer are then polished by, for example, CMP, until the upper coil portion 20 and the magnetic layers 42 and 43 are exposed.

Next, the insulating layer 64 is formed over the entire top surface of the stack. Then, the insulating layer 64 is selectively etched to form therein an opening for exposing the top surface of the magnetic layer 42, and the top surface of a portion of the insulating layer 64 covering the top surface of the magnetic layer 43 is also etched. The magnetic layer 44 is then formed by frame plating, for example. Next, the protective layer 70 is formed over the entire top surface of the stack. For example, the step of forming the wirings 83 and 84 is performed simultaneously with a series of steps from the step of forming the main pole 15 to the step of forming the protective layer 70.

Wiring and a plurality of terminals including the terminals 81 and 82 are then formed on the protective layer 70, and the substrate 1 is cut near the position ABS where the medium facing surface 80 is to be formed. The cut surface is then polished into the medium facing surface 80, and further processes such as fabrication of flying rails are performed to complete the magnetic head.

Now, the unique functions and effects of the magnetic head according to the present embodiment will be described through comparison with magnetic heads of first to third comparative examples. The magnetic heads of the first and second comparative examples are each without the accommodation section 50 of the present embodiment. Further, in the magnetic heads of the first and second comparative examples, the lower return path section 30 and components therearound are different from those in the magnetic head according to the present embodiment. The magnetic head of the third comparative example will be described later.

Figure 18:
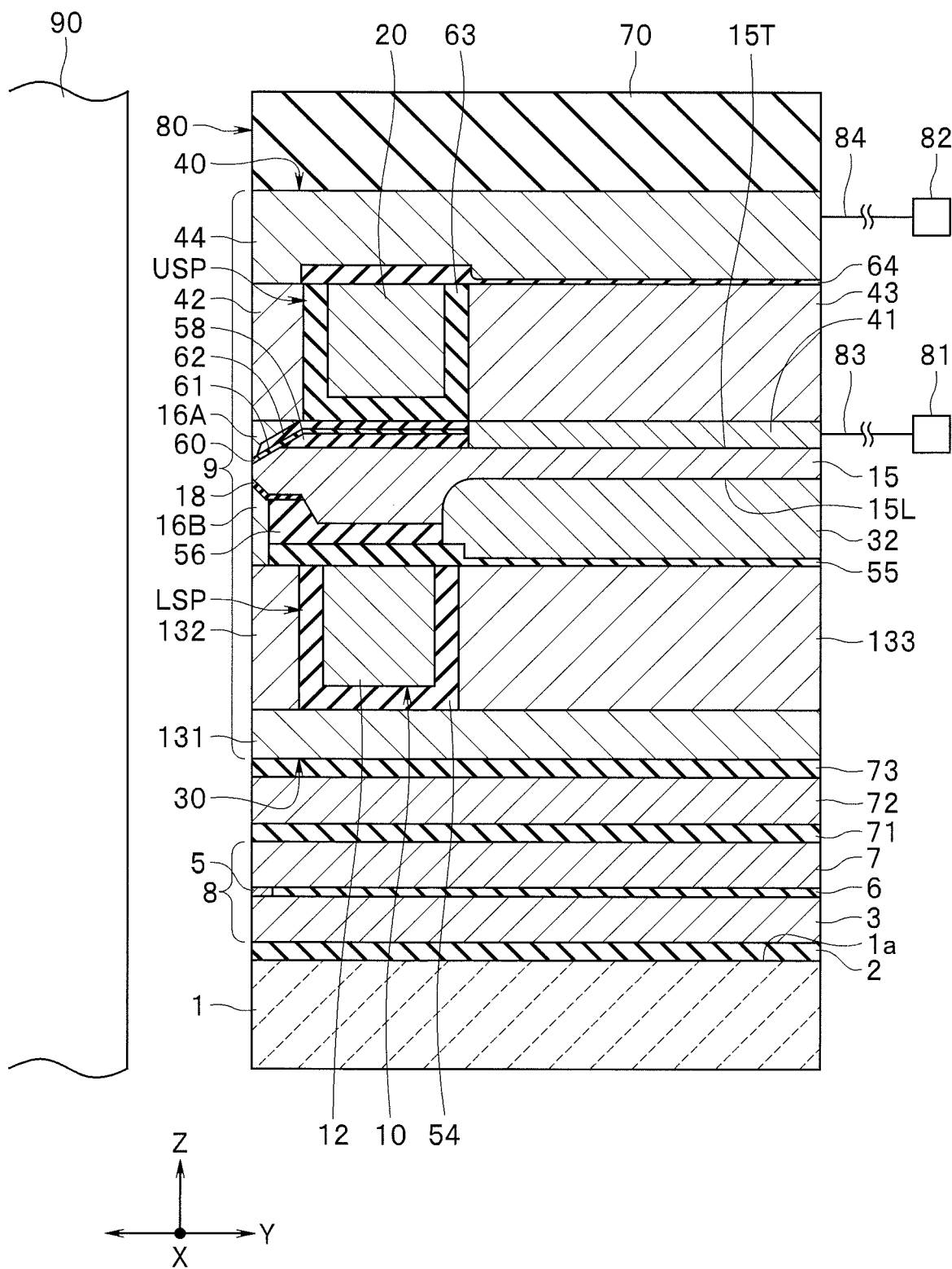
FIG. 18 is a cross-sectional view illustrating a configuration of a magnetic head of a first comparative example.

First, the configuration of the magnetic head of the first comparative example will be described in detail with reference to FIG. 18. FIG. 18 is a cross-sectional view illustrating the configuration of the magnetic head of the first comparative example. In the magnetic head of the first comparative example, the lower return path section 30 includes magnetic layers 131, 132, and 133 instead of the magnetic film 31 in the present embodiment.

Further, the magnetic head of the first comparative example includes a nonmagnetic layer 73 of a nonmagnetic material disposed on the middle shield layer 72. The nonmagnetic layer 73 is formed of alumina, for example. The magnetic layer 131 is disposed on the nonmagnetic layer 73. The magnetic layers 132 and 133 are both disposed on the magnetic layer 131. The magnetic layer 132 is located near the medium facing surface 80. The magnetic layer 133 is located farther from the medium facing surface 80 than the magnetic layer 132. The magnetic layers 131 and 132 have their respective end faces located in the medium facing surface 80.

In the magnetic head of the first comparative example, the lower coil portion 10 is wound around the magnetic layer 133. The lower coil portion 10 includes a coil element 12 extending to pass through the lower space LSP, instead of the coil element in the present embodiment. Specifically, the coil element 12 passes through a portion of the lower space LSP between the magnetic layer 132 and the magnetic layer 133. No portion of the coil other than the coil element 12 lies in the lower space LSP. The magnetic head of the first comparative example further includes a first insulating layer formed of an insulating material, lying on the nonmagnetic layer 73 and surrounding the magnetic layer 131. The first insulating layer is formed of alumina, for example.

In the magnetic head of the first comparative example, the insulating film 54 separates the lower coil portion 10 from the magnetic layers 131 to 133. The first nonmagnetic layer lies on the first insulating layer and surrounds the lower coil portion 10 and the magnetic layer 132. The leading shield 16B lies on a portion of the top surface of the magnetic layer 132. The insulating layer 55 lies on another portion of the top surface of the magnetic layer 132 and on the top surfaces of the lower coil portion 10, the magnetic layer 133, the insulating film 54 and the first nonmagnetic layer. The first portion of the insulating layer 55 is in contact with the top surface of the magnetic layer 133. The magnetic layer 32 is disposed over the magnetic layer 133 with the insulating layer 55 interposed therebetween. Note that the magnetic layer 32 and the magnetic layer 133 magnetically couple to each other even with the insulating layer 55 interposed between the magnetic layer 32 and the magnetic layer 133.

Figure 19:
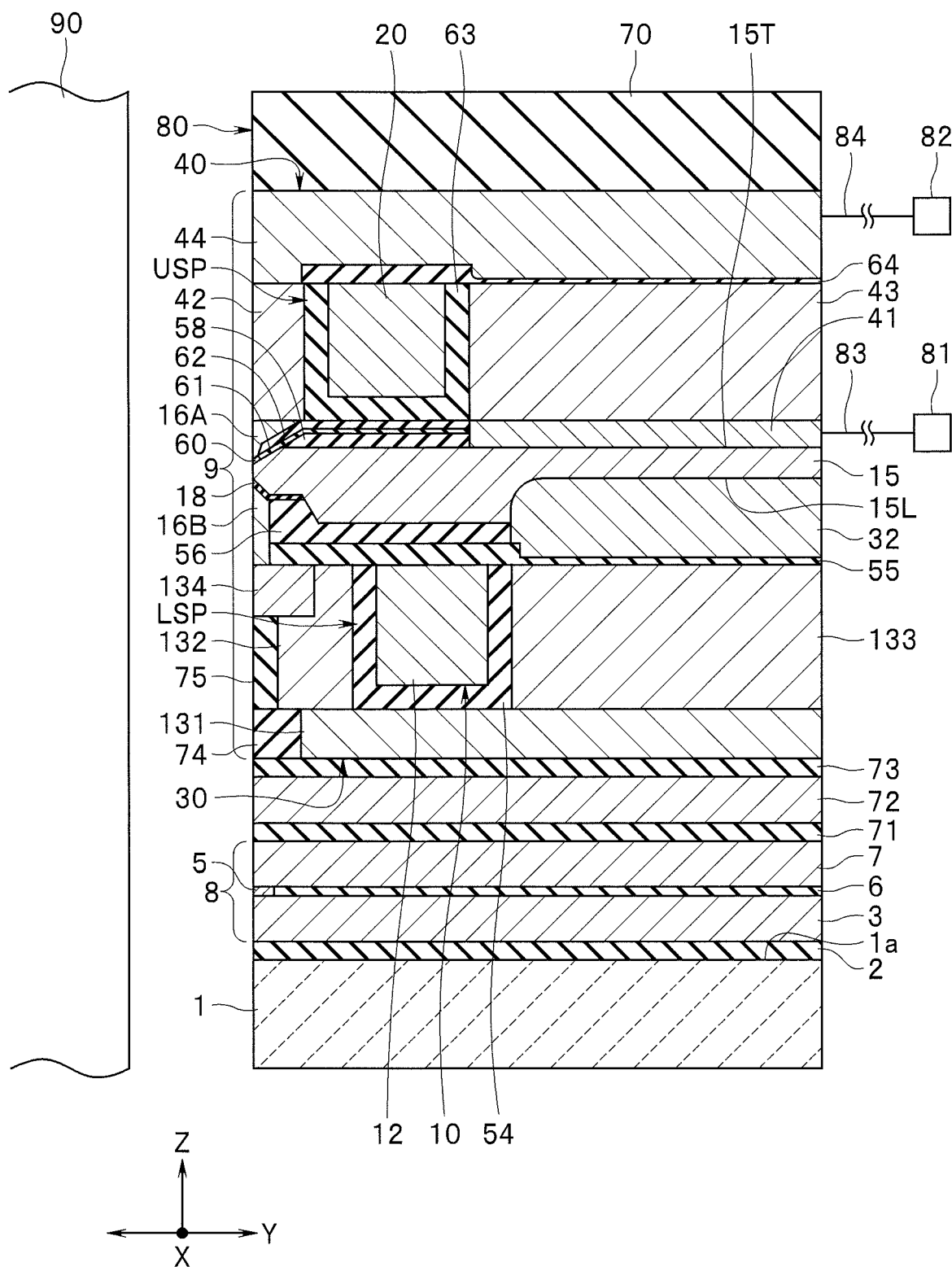
FIG. 19 is a cross-sectional view illustrating a configuration of a magnetic head of a second comparative example.

Next, the configuration of the magnetic head of the second comparative example will be described with reference to FIG. 19. FIG. 19 is a cross-sectional view illustrating the configuration of the magnetic head of the second comparative example. The magnetic head of the second comparative example is different from the magnetic head of the first comparative example in the following ways. In the magnetic head of the second comparative example, the magnetic layers 131 and 132 have their respective end faces facing the medium facing surface 80 and located at a distance from the medium facing surface 80. The first insulating layer is interposed between the end face of the magnetic layer 131 and the medium facing surface 80. The first nonmagnetic layer is interposed between the end face of the magnetic layer 132 and the medium facing surface 80. In FIG. 19, the reference numeral 74 represents the first insulating layer, and the reference numeral 75 represents the first nonmagnetic layer.

In the magnetic head of the second comparative example, the lower return path section 30 includes a magnetic layer 134 in addition to the magnetic layers 32 and 131 to 133. The magnetic layer 134 is embedded in the magnetic layer 132 and the first nonmagnetic layer 75. The magnetic layer 134 has an end face located in the medium facing surface 80. The top surfaces of the lower coil portion 10, the magnetic layers 132 to 134, the insulating film 54 and the first nonmagnetic layer 75 are even with each other. The leading shield 16B lies on a portion of the top surface of the magnetic layer 134. The insulating layer 55 lies on another portion of the top surface of the magnetic layer 134 and on the top surfaces of the lower coil portion 10, the magnetic layers 132 and 133, the insulating film 54 and the first nonmagnetic layer 75.

Next, a description will be given of the problems with the magnetic heads of the first and second comparative examples and the effects of the magnetic head according to the present embodiment. In the magnetic head of the first comparative example, the magnetic layers 131 and 132 of the lower return path section 30 have their respective end faces located in the medium facing surface 80. The magnetic head of the first comparative example gives rise to a problem that due to the heat generated by the lower coil portion 10 of the coil, the end face of each of the magnetic layers 131 and 132 constituting part of the medium facing surface 80 protrudes to cause the end face 15*a* of the main pole 15 to get farther from the recording medium 90, thus causing degradation in write characteristics.

In the magnetic head of the second comparative example, the magnetic layers 131 and 132 of the lower return path section 30 are located at a distance from the medium facing surface 80. The first insulating layer 74 is interposed between the magnetic layer 131 and the medium facing surface 80, and the first nonmagnetic layer 75 is interposed between the magnetic layer 132 and the medium facing surface 80. This makes it possible to prevent a portion of the medium facing surface 80 near the magnetic layers 131 and 132 from protruding, and to thereby prevent the end face 15*a* of the main pole 15 from getting farther from the recording medium 90. However, the magnetic head of the second comparative example is larger in the distance from the medium facing surface 80 to the magnetic layer 133 of the lower return path section 30, compared to the magnetic head of the first comparative example. Accordingly, in the magnetic head of the second comparative example, the magnetic path passing through the write shield 16, the lower return path section 30 and the main pole 15 is longer than in the magnetic head of the first comparative example.

According to the present embodiment, in contrast, the first portion 51 of the accommodation section 50 is interposed between the lower return path section 30 and the medium facing surface 80, and the first inclined portion 31A of the lower return path section 30 extends along the first inclined surface 51*a* of the first portion 51. According to the present embodiment, this makes it possible to reduce the length of the magnetic path compared to the magnetic head of the second comparative example, while preventing protrusion of a portion of the medium facing surface 80 near the first inclined portion 31A and thereby preventing the end face 15a of the main pole 15 from getting farther from the recording medium 90.

Figure 17:
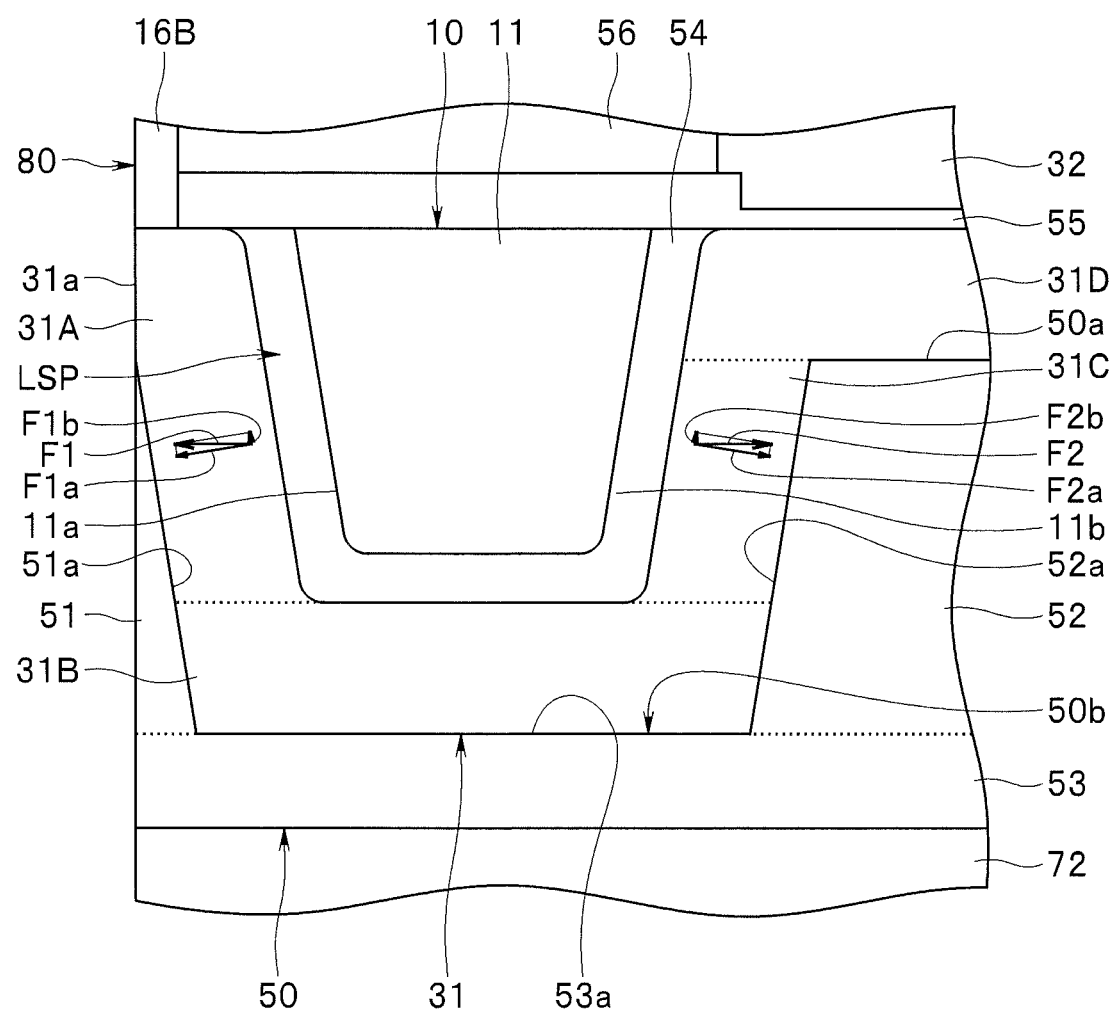
FIG. 17 is an explanatory diagram illustrating the function of an accommodation section of the first embodiment of the invention.

Furthermore, the present embodiment makes it possible to reduce the amount of protrusion of the exposed portion of the lower return path section 30 in the direction perpendicular to the medium facing surface 80. This effect will be described below with reference to FIG. 17 and FIG. 19. FIG. 17 is an explanatory diagram illustrating the function of the accommodation section 50.

In the magnetic head of the second comparative example, the magnetic layer 134 of the lower return path section 30 has an end face located in the medium facing surface 80. When the lower coil portion 10 of the coil generates heat, the lower coil portion 10 and components therearound are heated to expand. This causes the magnetic layer 134 to be subjected to an external force in the direction from the coil element 12 of the lower coil portion 10 to the medium facing surface 80. As a result, the magnetic layer 134 becomes deformed to be elongated in the direction outward from the medium facing surface 80.

The heat generated by the lower coil portion 10 also heats and expands the magnetic layer 134. This also causes the magnetic layer 134 to become deformed to be elongated in the direction outward from the medium facing surface 80.

Furthermore, if the lower coil portion 10 and the components therearound are heated to expand, the coil element 12 receives from the magnetic layer 133 a reaction force in the direction toward the medium facing surface 80. As a result, an external force in the direction toward the medium facing surface 80 is applied to the magnetic layer 134. This also causes the magnetic layer 134 to become deformed to be elongated in the direction outward from the medium facing surface 80.

If the magnetic layer 134 becomes deformed to be elongated in the direction outward from the medium facing surface 80 as described above, the end face of the magnetic layer 134 constituting part of the medium facing surface 80 protrudes. In the magnetic head of the second comparative example, the magnetic layer 134 becomes deformed to be elongated in the direction perpendicular to the medium facing surface 80, in particular.

In contrast, according to the present embodiment, if the lower coil portion 10 and the components therearound are heated to expand due to the heat generated by the lower coil portion 10, an external force in the direction from the coil element 11 of the lower coil portion 10 to the medium facing surface 80 is applied to the first inclined portion 31A of the lower return path section 30. In FIG. 17 the arrow denoted by the symbol F1 represents the external force applied to the first inclined portion 31A. The external force F1 can be decomposed into a component F1a in the direction perpendicular to the first inclined surface 51a and a component F1b in the direction parallel to the first inclined surface 51a and toward the end face 31a of the magnetic film 31.

The first portion 51 of the accommodation section 50 has the function of inhibiting a change in the position of the surface of the first inclined portion 31A facing the first portion 51. This function is exhibited more effectively in the case where the first portion 51 is formed of an inorganic insulating material harder than the first inclined portion 31A, i.e., the magnetic film 31. This function causes the first inclined portion 31A to become deformed to be elongated in the direction of the component F1b. Furthermore, the first inclined portion 31A is also heated and expands due to the heat generated by the lower coil portion 10. This also causes the first inclined portion 31A to become deformed to be elongated in the direction of the component F1b.

On the other hand, if the lower coil portion 10 and the components therearound are heated to expand, an external force in the direction from the coil element 11 away from the medium facing surface 80 is applied to the second inclined portion 31C. In FIG. 17 the arrow denoted by the symbol F2 represents the external force applied to the second inclined portion 31C. The external force F2 can be decomposed into a component F2a in the direction perpendicular to the second inclined surface 52a and a component F2b in the direction parallel to the second inclined surface 52a and toward the magnetic layer 32.

The second portion 52 of the accommodation section 50 has the function of inhibiting a change in the position of the surface of the second inclined portion 31C facing the second portion 52. This function is exhibited more effectively in the case where the second portion 52 is formed of an inorganic insulating material harder than the second inclined portion 31C, i.e., the magnetic film 31. This function causes the second inclined portion 31C to become deformed to be elongated in the direction of the component F2b. Furthermore, the second inclined portion 31C is also heated and expands due to the heat generated by the lower coil portion 10. This also causes the second inclined portion 31C to become deformed to be elongated in the direction of the component F2b.

Here, a portion of the first inclined portion 31A at and near the end face 31a of the magnetic film 31 exposed in the medium facing surface 80 will be referred to as an exposed portion. The exposed portion corresponds to the magnetic layer 134 of the magnetic head of the second comparative example. In the present embodiment, the exposed portion is also deformed to be elongated in the direction of the component F1b. Therefore, the amount of protrusion of the end face 31a of the magnetic film 31 in the direction perpendicular to the medium facing surface 80 is smaller than in the case where the exposed portion is deformed to be elongated in the direction perpendicular to the medium facing surface 80 like the magnetic layer 134 of the magnetic head of the second comparative example.

For the above-described reason, according to the present embodiment, the amount of protrusion of the exposed portion in the direction perpendicular to the medium facing surface is reduced as compared to the magnetic head of the second comparative example.

For the magnetic head of the first comparative example, the magnetic layers 131 to 133 are formed in separate steps. Likewise, for the magnetic head of the second comparative example, the magnetic layers 131 to 134 are formed in separate steps. In contrast, according to the present embodiment, forming the magnetic film 31 results in simultaneous formation of the first inclined portion 31A, the first horizontal portion 31B, the second inclined portion 31C and the second horizontal portion 31D. The present embodiment thus achieves a smaller number of process steps compared to the magnetic heads of the first and second comparative examples.

Furthermore, as illustrated in FIG. 2, FIG. 18 and FIG. 19, in the present embodiment, a portion of the lower return path section 30 around which the lower coil portion 10 is wound is smaller in volume than in the magnetic heads of the first and second comparative examples. The present embodiment thus allows the amount of expansion of the lower return path section 30 due to the heat generated by the lower coil portion 10 to be smaller, and consequently allows the amount of protrusion of the exposed portion to be smaller than in the magnetic heads of the first and second comparative examples.

In the present embodiment, the coil element 11 includes the third and fourth inclined surfaces 11a and 11b. By virtue of this, the present embodiment makes it possible to prevent degradation in the write characteristics while achieving a shorter magnetic path passing through the write shield 16, the lower return path section 30 and the main pole 15, compared to a case where the coil element 11 includes only the third inclined surface 11a. This effect will be described below through comparison with the magnetic head of the third comparative example.

Here, a coil element of a comparative example having a front end face closest to the medium facing surface 80 and a rear end face farthest from the medium facing surface 80 will be contemplated. The coil element of the comparative example is one that extends to pass through the lower space LSP, like the coil element 11 of the present embodiment. The front end face of the coil element of the comparative example is inclined with respect to the medium facing surface 80 in a manner similar to that in which the third inclined surface of the coil element 11 of the present embodiment is inclined. The rear end face of the coil element of the comparative example is perpendicular to the top surface 1a of the substrate 1. The magnetic head of the third comparative example is a magnetic head including the coil element of the comparative example instead of the coil element 11.

If comparison is made between the magnetic head according to the present embodiment and the magnetic head of the third comparative example with the position of the second inclined portion 31C being taken to be the same, the coil element 11 is larger in cross-sectional area in the main cross section than the coil element of the comparative example. Therefore, the amount of heat generated by the lower coil portion 10 is lower in the present embodiment than in the magnetic head of the third comparative example. By virtue of this, the present embodiment makes it possible to reduce the amount of protrusion of a portion of the medium facing surface 80 near the lower return path section 30, compared to the magnetic head of the third comparative example.

If comparison is made between the magnetic head according to the present embodiment and the magnetic head of the third comparative example with the coil element 11 and the coil element of the comparative example being taken to be equal in cross-sectional area in the main cross section, the distance from the medium facing surface 80 to the second inclined portion 31C is smaller in the magnetic head according to the present embodiment than in the magnetic head of the third comparative example. The present embodiment thus makes it possible to provide a shorter magnetic path passing through the write shield 16, the lower return path section 30 and the main pole 15, compared to the magnetic head of the third comparative example.

By virtue of the foregoing, the present embodiment makes it possible to prevent degradation in the write characteristics while achieving a reduction in length of the magnetic path passing through the write shield 16, the lower return path section 30 and the main pole 15.

Second Embodiment

Figure 20:
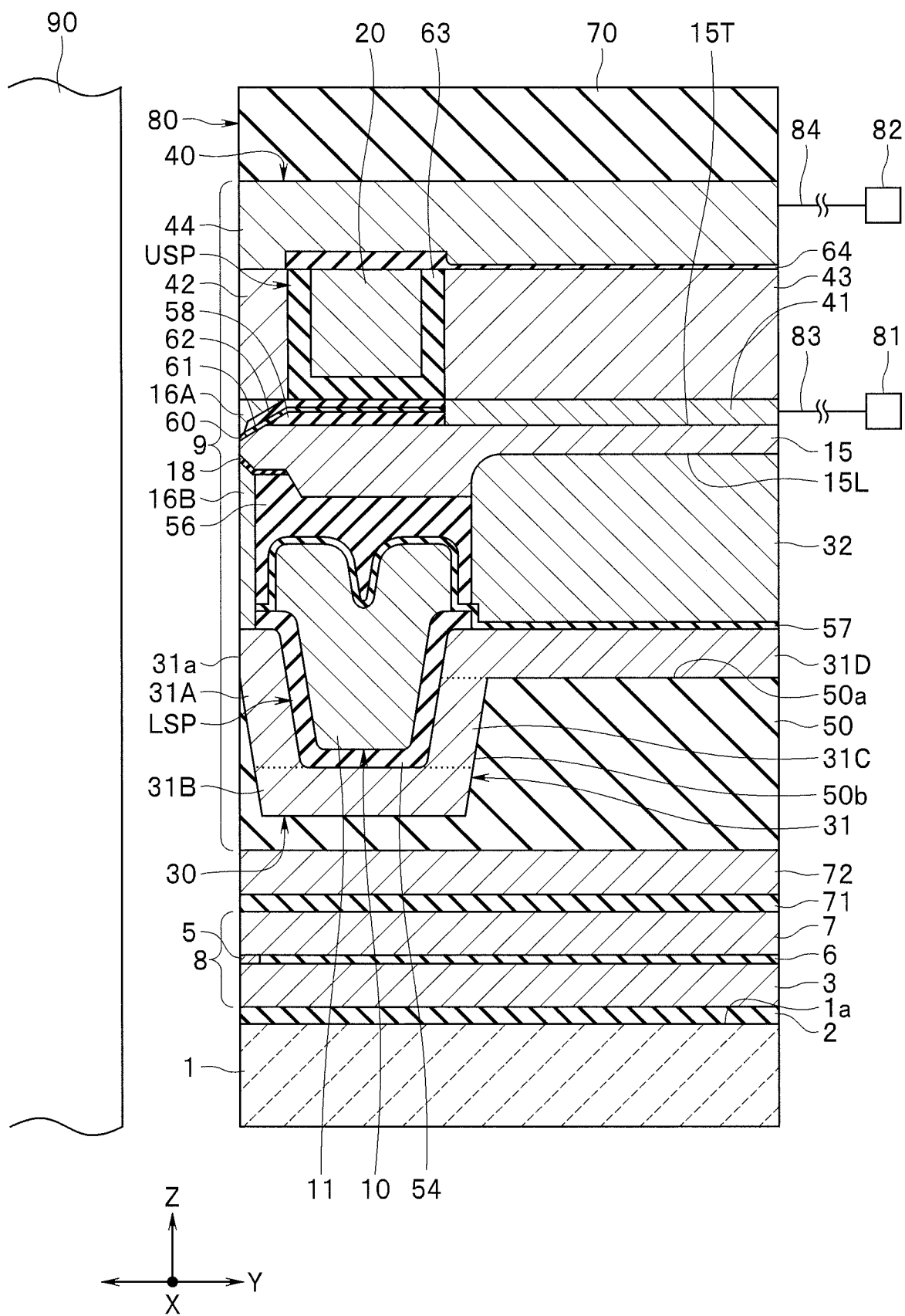
FIG. 20 is a cross-sectional view illustrating a configuration of a magnetic head according to a second embodiment of the invention.

A magnetic head according to a second embodiment of the invention will now be described with reference to FIG. 20. FIG. 20 is a cross-sectional view illustrating a configuration of the magnetic head according to the present embodiment.

The magnetic head according to the present embodiment is different from the magnetic head according to the first embodiment in the following ways. In the present embodiment, the non-illustrated first nonmagnetic layer of the first embodiment is omitted. Further, in the present embodiment, the top surface of the lower coil portion 10 of the coil, the top surfaces of the first inclined portion 31A and the second horizontal portion 31D of the magnetic film 31 of the lower return path section 30 and the top surface of the insulating film 54 are not even with each other. The insulating film 54 rides over the top surface of the first inclined portion 31A and the top surface of the second horizontal portion 31D. A portion of the lower coil portion 10 rides over a portion of the insulating film 54 lying on the top surface of the first inclined portion 31A. Another portion of the lower coil portion 10 rides over a portion of the insulating film 54 lying on the top surface of the second horizontal portion 31D.

Further, the magnetic head according to the present embodiment includes an insulating layer 57 formed of an insulating material, instead of the insulating layer 55 of the first embodiment. The insulating layer 57 covers the lower coil portion 10, the second horizontal portion 31D and the insulating film 54. The magnetic layer 32 is disposed over the second horizontal portion 31D with the insulating layer 57 interposed therebetween. Note that the magnetic film 31 and the magnetic layer 32 magnetically couple to each other even with the insulating layer 57 interposed between the second horizontal portion 31D, i.e., the magnetic film 31 and the magnetic layer 32. The nonmagnetic layer 56 lies on the insulating layer 57 and surrounds the lower coil portion 10, the leading shield 16B, the magnetic film 31 and the magnetic layer 32. The insulating layer 57 is formed of alumina, for example.

A manufacturing method of the magnetic head according to the present embodiment will now be described with reference to FIG. 21 to FIG. 24. FIG. 21 to FIG. 24 each illustrate a stack of layers formed in the process of manufacturing the magnetic head according to the present embodiment. FIG. 21 to FIG. 24 omit the illustration of portions that are closer to the substrate 1 relative to the accommodation section 50. FIG. 21 to FIG. 24 each illustrate a cross section perpendicular to the medium facing surface 80 and the top surface 1a of the substrate 1. In FIG. 21 to FIG. 24, the symbol ABS represents the position where the medium facing surface 80 is to be formed.

Figure 21:
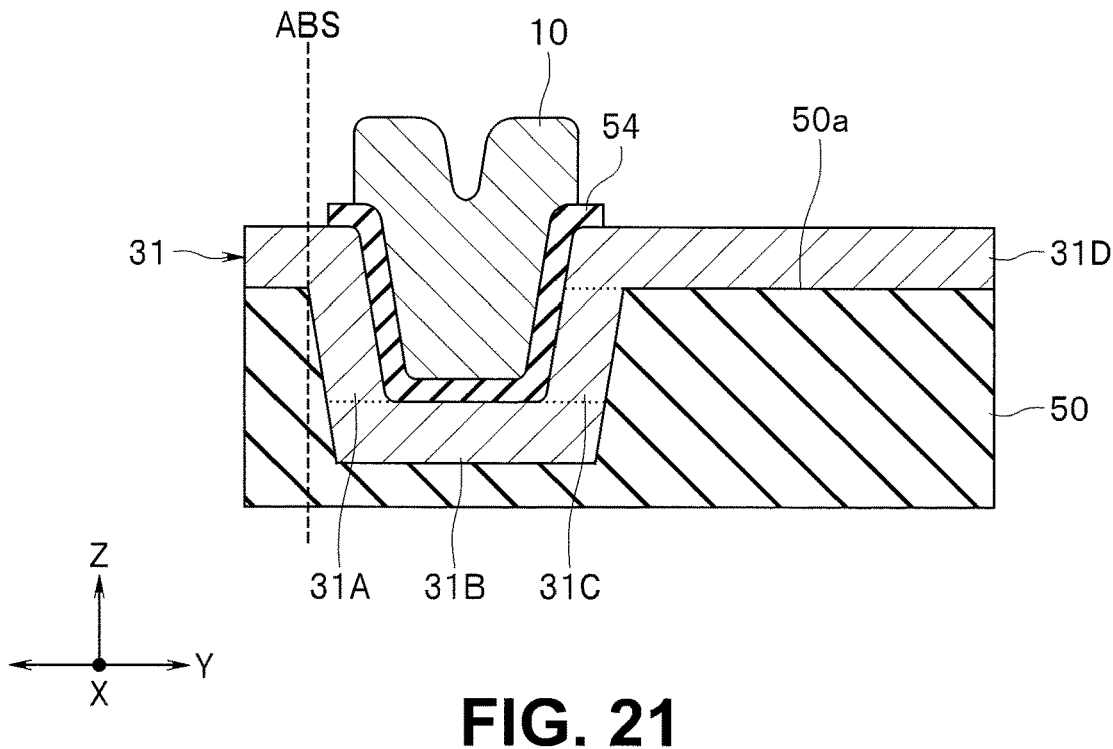
FIG. 21 is a cross-sectional view illustrating a step of a manufacturing method of the magnetic head according to the second embodiment of the invention.

The manufacturing method of the magnetic head according to the present embodiment is the same as the first embodiment up to the step of forming the insulating film 54 (see FIG. 11). FIG. 21 illustrates the next step. In this step, first, the lower coil portion 10 is formed on the insulating film 54. The method of forming the lower coil portion 10 is the same as the method of forming the conductive layer 10P in the first embodiment. Next, the insulating film 54 is selectively etched to form therein a first opening for exposing a portion of the top surface of the first inclined portion 31A and a second opening for exposing a portion of the top surface of the second horizontal portion 31D.

Figure 22:
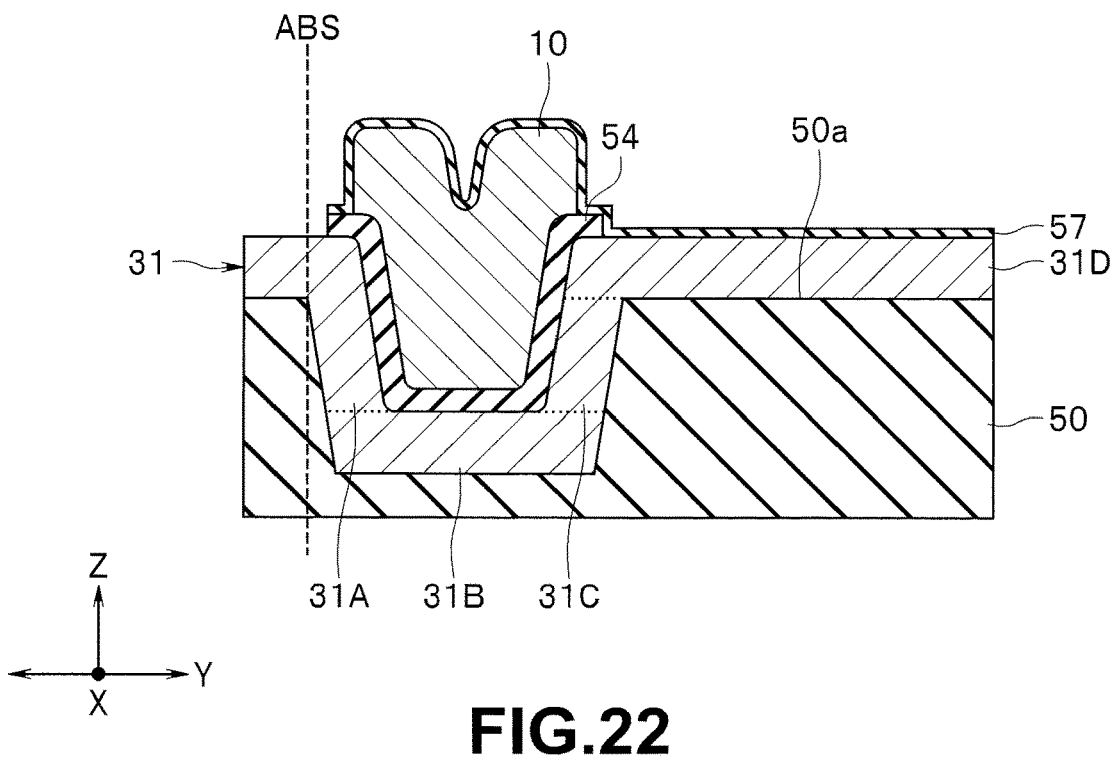
FIG. 22 is a cross-sectional view illustrating a step that follows the step illustrated in FIG. 21.

FIG. 22 illustrates the next step. In this step, first, the insulating layer 57 is formed over the entire top surface of the stack. The insulating layer 57 is then selectively etched to form therein a first opening for exposing a portion of the top surface of the first inclined portion 31A and a second opening for exposing the coil connection 10E (see FIG. 4) of the lower coil portion 10.

Figure 23:
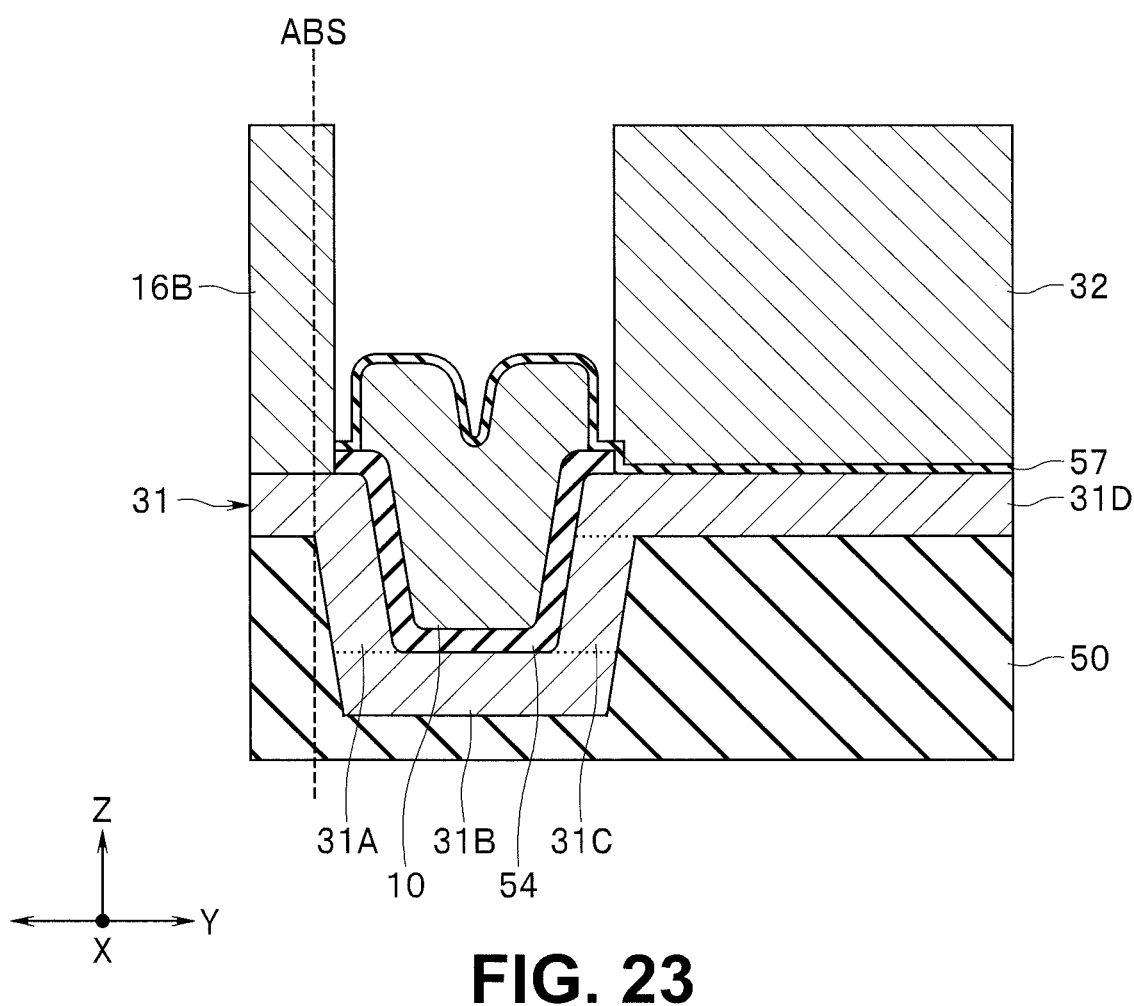
FIG. 23 is a cross-sectional view illustrating a step that follows the step illustrated in FIG. 22.

FIG. 23 illustrates the next step. In this step, the leading shield 16B is formed on the first inclined portion 31A at the position of the first opening, the magnetic layer 32 is formed on a portion of the insulating layer 57 covering the top surface of the second horizontal portion 31D, and the non-illustrated first connection layer is formed on the coil connection 10E at the position of the second opening.

Figure 24:
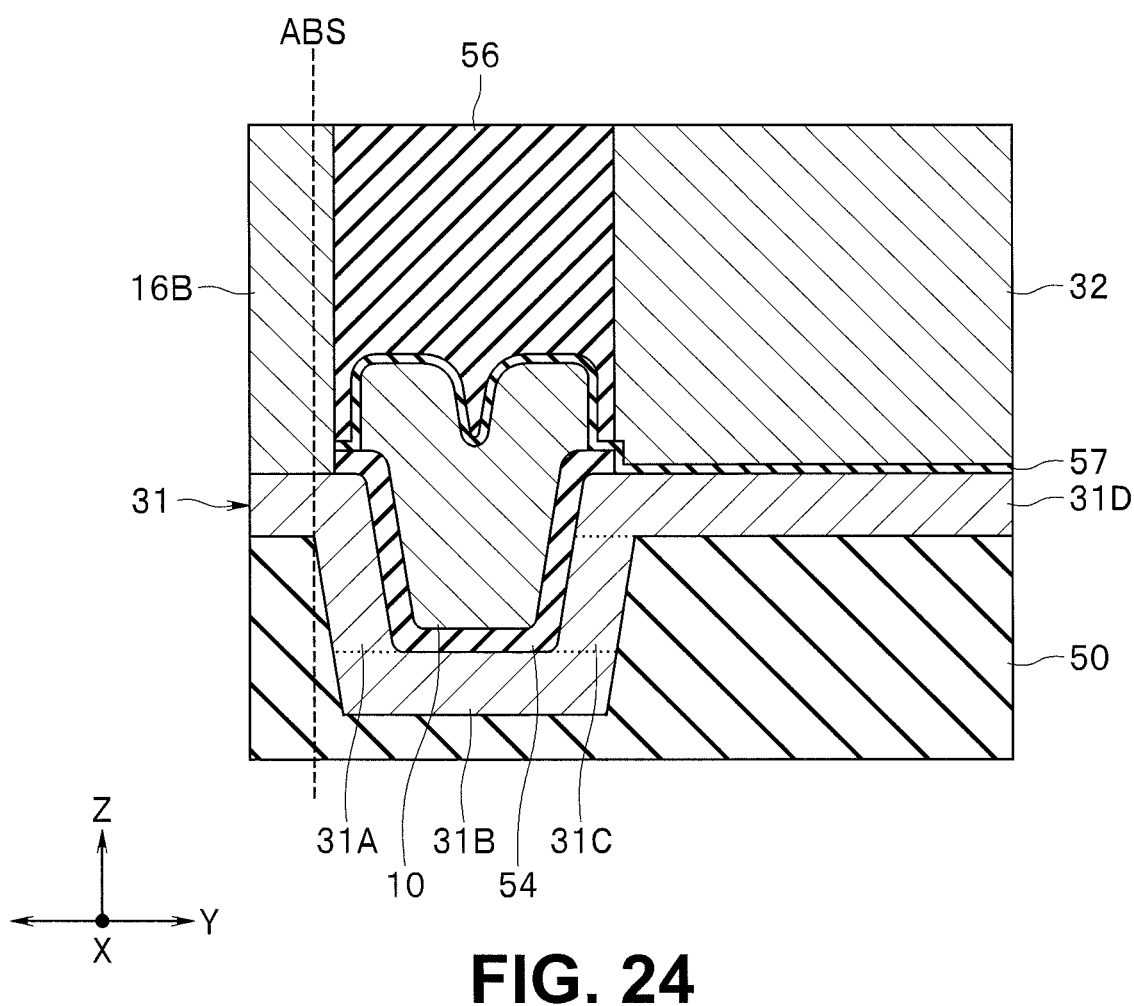
FIG. 24 is a cross-sectional view illustrating a step that follows the step illustrated in FIG. 23.

FIG. 24 illustrates the next step. In this step, first, the nonmagnetic layer 56 is formed over the entire top surface of the stack. The nonmagnetic layer 56 is then polished by, for example, CMP until the leading shield 16B, the magnetic layer 32 and the first connection layer are exposed. The subsequent steps are the same as those in the first embodiment.

In the present embodiment, none of the step of forming the first nonmagnetic layer, the step of polishing the conductive layer 10P and the non-illustrated first nonmagnetic layer, and the step of etching the conductive layer 10P, the insulating film 54 and the non-illustrated first nonmagnetic layer is performed. The present embodiment thus achieves a smaller number of process steps as compared to the first embodiment.

The other configuration, function and effects of the present embodiment are similar to those of the first embodiment.

Third Embodiment

Figure 25:
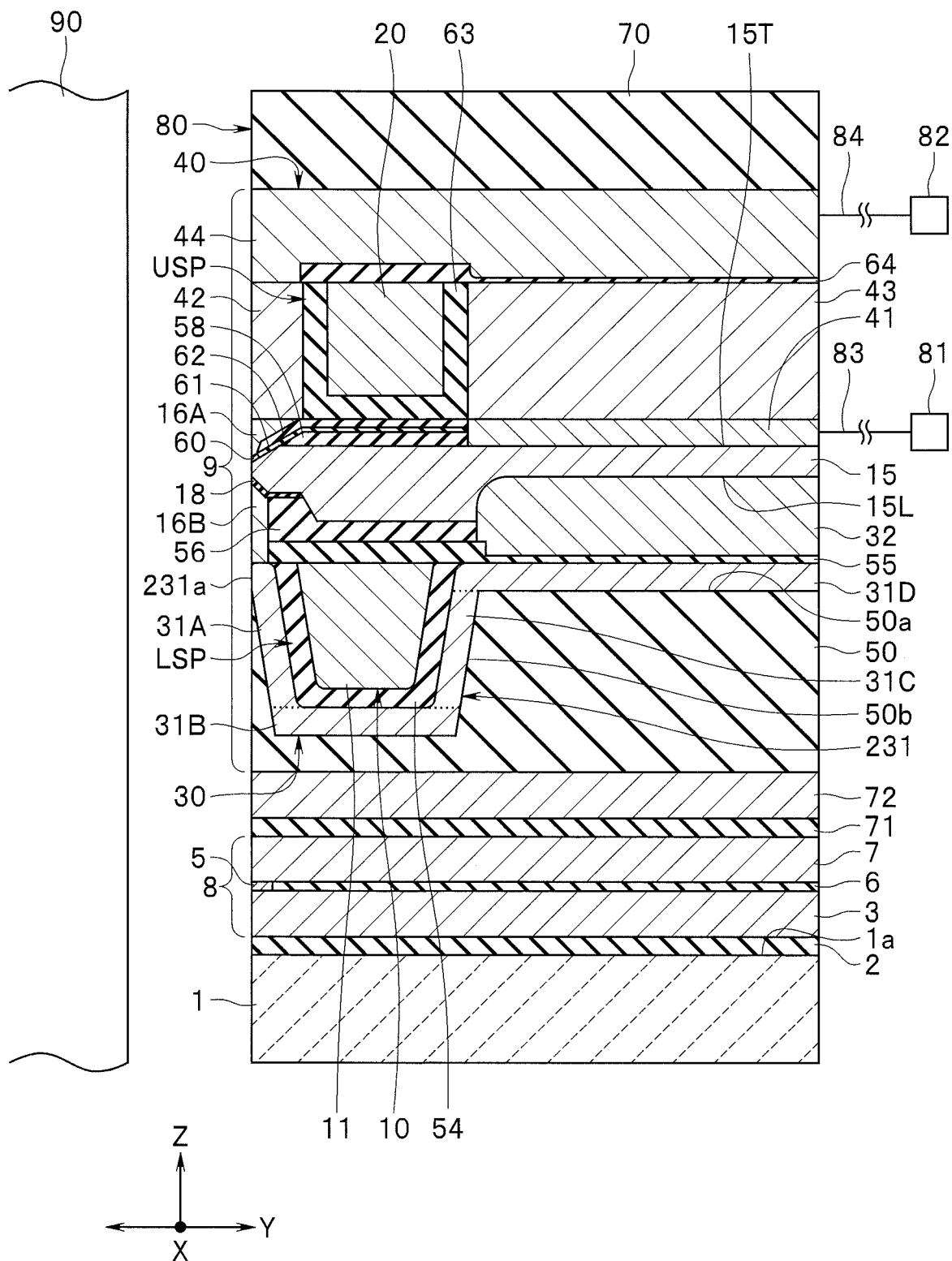
FIG. 25 is a cross-sectional view illustrating a configuration of a magnetic head according to a third embodiment of the invention.

A magnetic head according to a third embodiment of the invention will now be described with reference to FIG. 25. FIG. 25 is a cross-sectional view illustrating a configuration of the magnetic head according to the present embodiment.

The magnetic head according to the present embodiment is different from the magnetic head according to the first embodiment in the following ways. In the present embodiment, the lower return path section 30 includes a magnetic film 231 instead of the magnetic film 31 of the first embodiment. Like the magnetic film 31, the magnetic film 231 includes a first inclined portion 31A, a first horizontal portion 31B, a second inclined portion 31C, and a second horizontal portion 31D. The magnetic film 231 has an end face 231a located in the medium facing surface 80. The end face 231a of the magnetic film 231 is located farther from the top surface 1a of the substrate 1 than the accommodation section 50. The first inclined portion 31A has the end face 231a and a top surface farthest from the top surface 1a of the substrate 1. The insulating film 54 separates the lower coil portion 10 from the magnetic film 231.

A manufacturing method of the magnetic head according to the present embodiment is different from the method according to the first embodiment as described below. In the present embodiment, the step of forming the magnetic film 231 is performed instead of the step of forming the magnetic film 31 of the first embodiment. In the present embodiment, the magnetic film 231 is formed by a dry process such as sputtering. The magnetic film 231 has a thickness in the range of 0.1 to 0.4 μm, for example.

In the case of forming a magnetic film by frame plating, as is the case with the magnetic film 31 of the first embodiment, an electrode film used as a seed and an electrode is typically formed and then the magnetic film is formed. Then, an unwanted portion of the electrode film not covered with the magnetic film is removed by etching. In contrast, in the case of forming a magnetic film by a dry process such as sputtering as is the case with the magnetic film 231 of the present embodiment, no electrode film is required. Accordingly, neither of the step of forming the electrode film and the step of removing the unwanted portion of the electrode film is required. The present embodiment thus enables a reduction in the number of process steps, as compared to the case of forming the magnetic film 231 by frame plating.

The other configuration, function and effects of the present embodiment are similar to those of the first embodiment.

Fourth Embodiment

Figure 26:
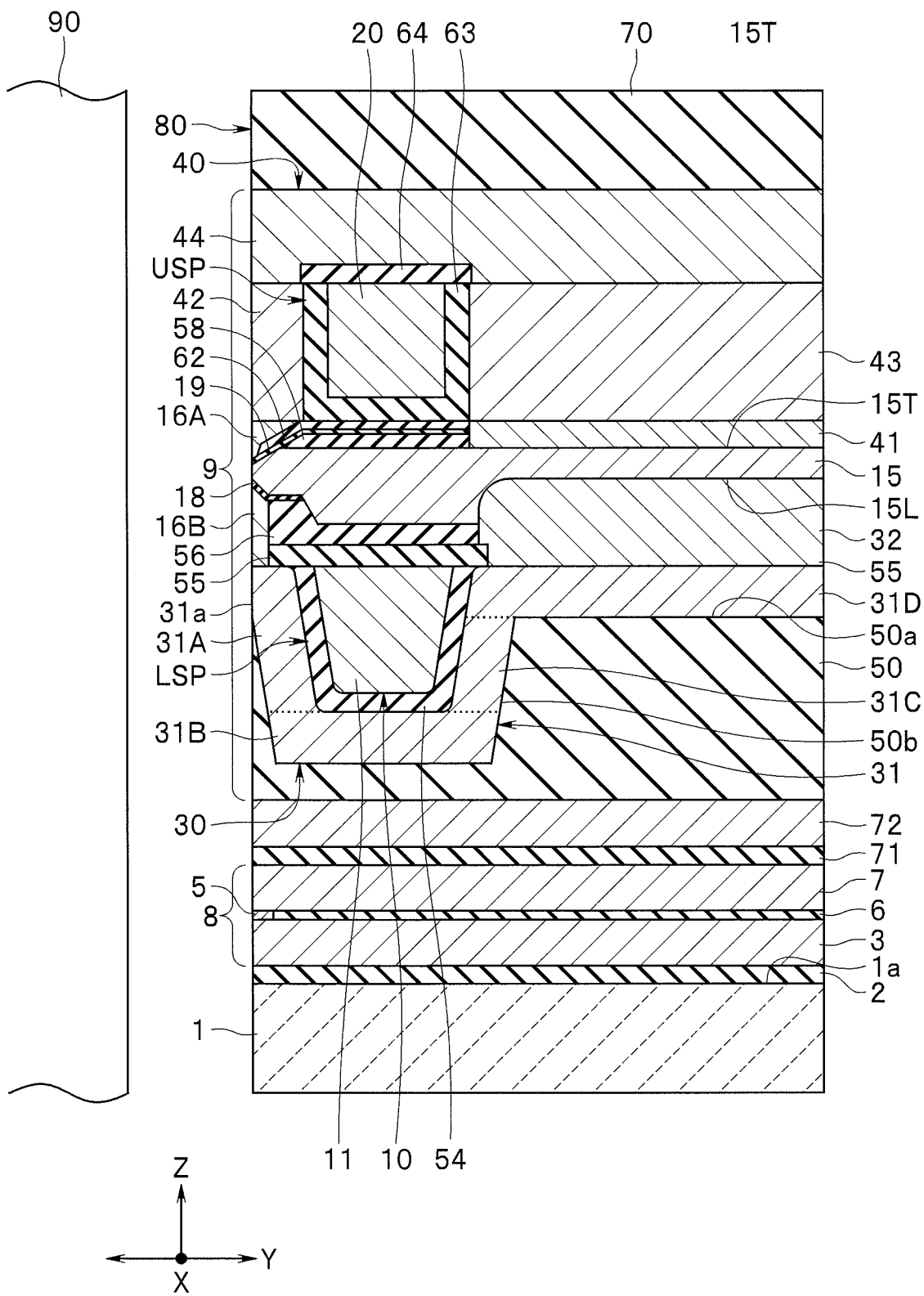
FIG. 26 is a cross-sectional view illustrating a configuration of a magnetic head according to a fourth embodiment of the invention.
Figure 27:
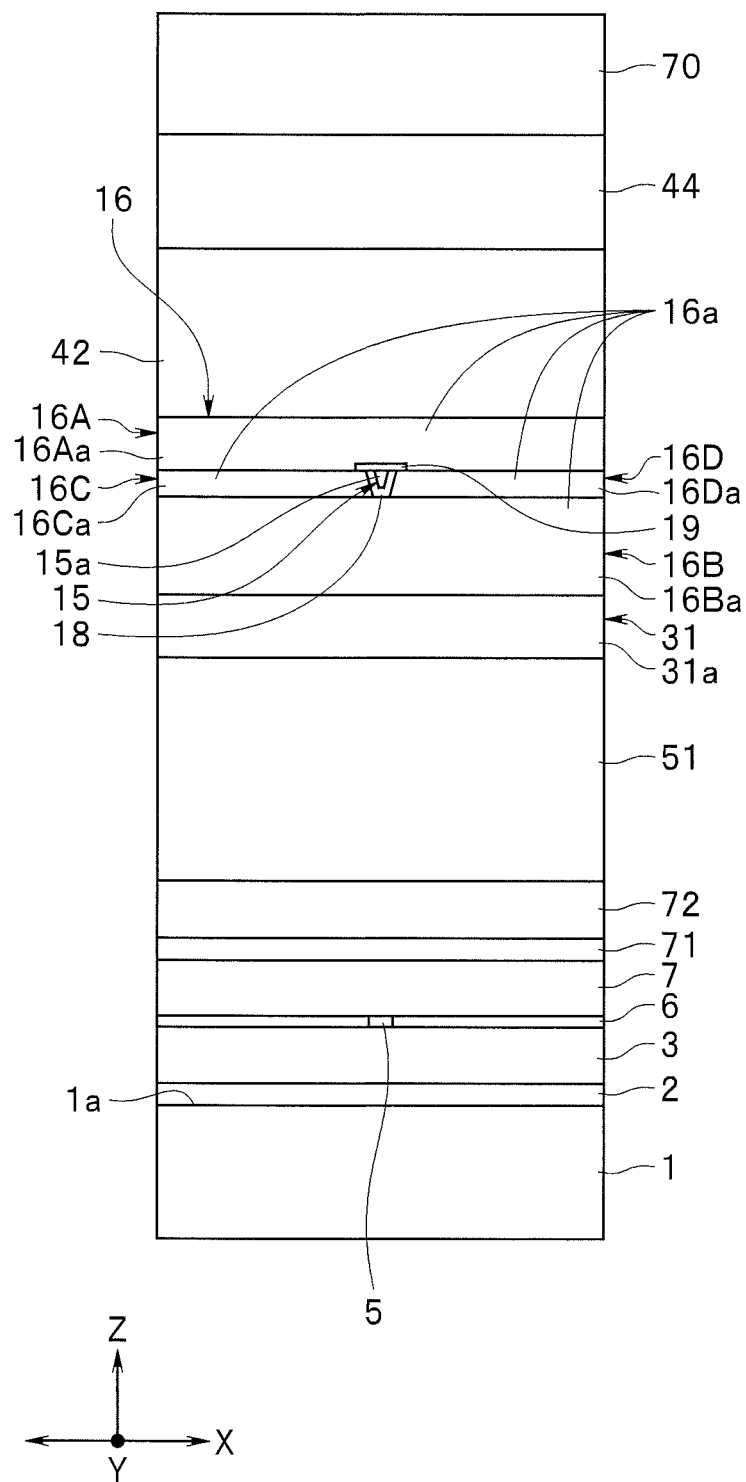
FIG. 27 is a front view illustrating the medium facing surface of the magnetic head according to the fourth embodiment of the invention.

Next, a magnetic head according to a fourth embodiment of the invention will be described with reference to FIG. 26 and FIG. 27. FIG. 26 is a cross-sectional view illustrating a configuration of the magnetic head according to the present embodiment. FIG. 27 is a cross-sectional view illustrating the medium facing surface of the magnetic head according to the present embodiment.

The magnetic head according to the present embodiment is different from the magnetic head according to the first embodiment in the following ways. In the present embodiment, the spin torque oscillator 60, the insulating layer 61, the terminals 81 and 82, the wirings 83 and 84, and the second gap layer of the first embodiment are omitted. Instead, the magnetic head according to the present embodiment includes a second gap layer 19 formed of a nonmagnetic material. The second gap layer 19 has an end face located in the medium facing surface 80, and covers the main pole 15 and the nonmagnetic layer 58. An example of the nonmagnetic material used to form the second gap layer 19 is an insulating material such as alumina or silicon oxide.

In the present embodiment, the insulating layer 62 is disposed on the second gap layer 19. The trailing shield 16A is disposed on the side shields 16C and 16D, the second gap layer 19 and the insulating layer 62, and in contact with the top surfaces of the side shields 16C and 16D, the second gap layer 19 and the insulating layer 62. In the medium facing surface 80, a portion of the first end face portion 16Aa of the trailing shield 16A is spaced a predetermined distance away from the end face 15a of the main pole 15, the predetermined distance being provided by the thickness of the second gap layer 19.

In the present embodiment, the insulating layer 55 has an opening for exposing the top surface of the second horizontal portion 31D of the magnetic film 31. The magnetic layer 32 is disposed on the second horizontal portion 31D and in contact with the top surface of the second horizontal portion 31D.

In the present embodiment, the insulating layer 64 has an opening for exposing the top surface of the magnetic layer 43. The magnetic layer 44 is disposed on the magnetic layers 42 and 43 and the insulating layer 64, and in contact with the top surfaces of the magnetic layers 42 and 43.

Next, a manufacturing method of the magnetic head according to the present embodiment will be described briefly. The manufacturing method of the magnetic head according to the present embodiment includes none of the steps of forming the spin torque oscillator 60, forming the second gap layer, forming the insulating layer 61, and forming the wirings 83 and 84 of the first embodiment. The step of forming the second gap layer 19 is performed after the main pole 15 is completed. The step of forming the insulating layer 62 is performed after the step of forming the second gap layer 19.

The other configuration, function and effects of the present embodiment are similar to those of the first embodiment.

The present invention is not limited to the foregoing embodiments, and various modifications may be made thereto. As long as the requirements of the appended claims are met, the configurations, shapes and locations of the coil element 11 of the lower coil portion 10, the first and second inclined portions 31A and 31C of the lower return path section 30, and the accommodation section 50 are not limited to the examples illustrated in the foregoing embodiments but can be freely chosen. For example, the accommodation section 50 may be composed of a nonmagnetic layer and a nonmagnetic film. More specifically, the accommodation section 50 may be composed of a nonmagnetic layer with an opening having a wall face corresponding to the first inclined surface 51a and a wall face corresponding to the second inclined surface 52a, and a nonmagnetic film formed along the surface of the nonmagnetic layer.

The magnetic film 31 or 231 need not necessarily include the end face located in the medium facing surface 80 or the second horizontal portion 31D. In such a case, the top surface of the lower coil portion 10 of the coil, the top surfaces of the first inclined portion 31A and the second inclined portion 31C and the top surface of the insulating film 54 may be even with each other.

The present invention is applicable not only to a magnetic head including the spin torque oscillator 60 but also to a magnetic head used for what is called thermally-assisted magnetic recording.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head comprising:
a medium facing surface configured to face a recording medium;
a coil configured to generate a magnetic field corresponding to data to be written on the recording medium;
a main pole having an end face located in the medium facing surface, the main pole being configured to pass a magnetic flux corresponding to the magnetic field generated by the coil and to generate a write magnetic field for writing the data on the recording medium;
a write shield formed of a magnetic material and having a shield end face located in the medium facing surface;
a lower return path section formed of a magnetic material;
an accommodation section formed of a nonmagnetic material and accommodating at least part of the lower return path section; and
a substrate having a top surface, wherein
the coil, the main pole, the write shield, the lower return path section and the accommodation section are located above the top surface of the substrate,
the shield end face includes a first end face portion located farther from the top surface of the substrate than the end face of the main pole, and a second end face portion located closer to the top surface of the substrate than the end face of the main pole,
the lower return path section is located between the main pole and the top surface of the substrate and connects a portion of the main pole located away from the medium facing surface to the write shield so that a lower space is defined by the main pole, the write shield and the lower return path section,
the coil includes a coil element extending to pass through the lower space,
no portion of the coil other than the coil element lies in the lower space,
the accommodation section includes a first portion located closer to the medium facing surface than the coil element and interposed between the lower return path section and the medium facing surface, and a second portion located farther from the medium facing surface than the coil element,
the first portion has a first inclined surface facing the lower return path section,
the second portion has a second inclined surface facing the lower return path section,
the coil element has a third inclined surface opposed to the first inclined surface, and a fourth inclined surface opposed to the second inclined surface,
each of the first to fourth inclined surfaces has a top end farthest from the top surface of the substrate and a bottom end closest to the top surface of the substrate,
each of the first and third inclined surfaces is inclined with respect to the medium facing surface such that a distance from the medium facing surface to the bottom end is greater than a distance from the medium facing surface to the top end,
each of the second and fourth inclined surfaces is inclined with respect to the medium facing surface such that the distance from the medium facing surface to the bottom end is smaller than the distance from the medium facing surface to the top end, and
the lower return path section includes a first inclined portion located between the first inclined surface and the third inclined surface and extending along the first inclined surface, and a second inclined portion located between the second inclined surface and the fourth inclined surface and extending along the second inclined surface.

2. The magnetic head according to claim 1, wherein
the first inclined portion further extends along the third inclined surface, and
the second inclined portion further extends along the fourth inclined surface.

3. The magnetic head according to claim 1, wherein the first and second portions of the accommodation section are formed of an inorganic insulating material.

4. The magnetic head according to claim 1, wherein a maximum dimension of the first portion of the accommodation section in a direction perpendicular to the medium facing surface falls within a range of 0.1 to 0.4 µm.

5. The magnetic head according to claim 4, wherein the maximum dimension of the first portion of the accommodation section in the direction perpendicular to the medium facing surface is 0.3 µm or less.

6. The magnetic head according to claim 1, wherein each of the first and second inclined surfaces forms an angle in a range of 5° to 45° with respect to the medium facing surface.

7. The magnetic head according to claim 1, wherein each of the third and fourth inclined surfaces forms an angle in a range of 5° to 45° with respect to the medium facing surface.

8. The magnetic head according to claim 1, wherein
the accommodation section further includes a third portion located between the lower return path section and the top surface of the substrate,
the third portion has a connecting surface connecting the first inclined surface of the first portion and the second inclined surface of the second portion,
the lower return path section includes a magnetic film extending along the first inclined surface, the connecting surface and the second inclined surface, and
the magnetic film includes the first and second inclined portions.

9. The magnetic head according to claim 8, wherein the magnetic film has an end face located in the medium facing surface at a position farther from the top surface of the substrate than the accommodation section.

\* \* \* \* \*